(12) United States Patent
Minamigata et al.

(10) Patent No.: US 8,733,793 B2
(45) Date of Patent: May 27, 2014

(54) STEERING COLUMN SUPPORT APPARATUS

(75) Inventors: Takahiro Minamigata, Gunma (JP); Minao Umeda, Gunma (JP); Takeshi Fujiwara, Gunma (JP); Osamu Tatewaki, Gunma (JP); Kiyoshi Sadakata, Gunma (JP); Toru Segawa, Gunma (JP)

(73) Assignee: NSK, Ltd. (JP)

( * ) Notice: Subject to any disclaimer, the term of this patent is extended or adjusted under 35 U.S.C. 154(b) by 0 days.

(21) Appl. No.: 13/379,472

(22) PCT Filed: Aug. 23, 2011

(86) PCT No.: PCT/JP2011/068903
§ 371 (c)(1),
(2), (4) Date: Feb. 16, 2012

(87) PCT Pub. No.: WO2012/049908
PCT Pub. Date: Apr. 19, 2012

(65) Prior Publication Data
US 2012/0240711 A1        Sep. 27, 2012

(30) Foreign Application Priority Data

Oct. 15, 2010   (JP) ................................ 2010-232443
Oct. 15, 2010   (JP) ................................ 2010-232444
Oct. 15, 2010   (JP) ................................ 2010-232445
Oct. 28, 2010   (JP) ................................ 2010-241751
Oct. 28, 2010   (JP) ................................ 2010-241752
May 11, 2011   (JP) ................................ 2011-106186

(51) Int. Cl.
*B62D 1/18*         (2006.01)

(52) U.S. Cl.
USPC ....................................................... 280/777

(58) Field of Classification Search
USPC ............. 280/775, 777; 188/371, 374; 74/492, 74/493
See application file for complete search history.

(56) References Cited

U.S. PATENT DOCUMENTS 5,704,641 A     1/1998   Shimizu et al.
5,788,279 A *   8/1998   Pfannebecker ............... 280/777
(Continued)

FOREIGN PATENT DOCUMENTS

JP           5071930       6/1975
JP          48127940       6/1975
(Continued)

*Primary Examiner* — Paul N Dickson
*Assistant Examiner* — Robert A Coker
(74) *Attorney, Agent, or Firm* — Hartman Global IP Law; Gary M. Hartman; Michael D. Winter

(57) ABSTRACT

The present invention provides construction that keeps the load required for a locking capsule 50*d* that is supported by the steering column to come out in the forward direction from a locking hole 48*b* that is formed in a fastening bracket 11*e* on the vehicle side low. Small through holes 52*e* are formed in a flange section 51*d* of the locking capsule 50*d*. Small notch sections 62*a* that are each open toward the inside of the locking hole 48*b* are formed in portions of the fastening bracket 11*e* on the vehicle side around the locking hole 48*b* that are aligned with each of the small through holes 52*e*. Injection molding is performed to inject synthetic resin 72 such that the synthetic resin 72 spans between these small through holes 48*b* and small notch sections 62*a*, and connects the locking capsule 50*d* and the fastening bracket 11*e* on the vehicle side. Moreover, part of the synthetic resin 72 penetrates into and solidifies in a small space 71 between the inside surfaces of the locking hole 48*b* and the outside surfaces of the locking capsule 50*d*.

5 Claims, 30 Drawing Sheets

(56) References Cited

U.S. PATENT DOCUMENTS

| | | | |
|---|---|---|---|
| 6,398,259 B1 * | 6/2002 | Palmer et al. | 280/777 |
| 7,367,588 B2 * | 5/2008 | Yamada | 280/777 |
| 7,707,908 B2 * | 5/2010 | Tanaka et al. | 74/493 |
| 2005/0236825 A1 * | 10/2005 | Sawada et al. | 280/775 |

FOREIGN PATENT DOCUMENTS

| | | |
|---|---|---|
| JP | 5138841 | 3/1976 |
| JP | 49111334 | 3/1976 |
| JP | 5039321 | 9/1976 |
| JP | 51119231 | 9/1976 |
| JP | 51121929 | 10/1976 |
| JP | 5241820 | 3/1977 |
| JP | 50128517 | 3/1977 |
| JP | 525984 | 6/1993 |
| JP | 07-117686 | 5/1995 |
| JP | 746595 | 10/1995 |
| JP | 08072728 | 3/1996 |
| JP | 2000006821 | 1/2000 |
| JP | 2005-067340 | 3/2005 |
| JP | 2005219641 | 8/2005 |
| JP | 3843234 | 11/2006 |
| JP | 2007069821 | 3/2007 |
| JP | 2008-006840 | 1/2008 |
| JP | 2008100597 | 5/2008 |

* cited by examiner (A)

(B)

(A)

(B)

(A)　　　　　　　　　(B)

STEERING COLUMN SUPPORT APPARATUS

TECHNICAL FIELD

The present invention relates to an improvement of a steering column support apparatus that supports a steering column such that the steering column can displace in the forward direction with respect to the vehicle body in order to enable the steering wheel to displace in the forward direction while absorbing impact energy that is applied to the steering wheel from the body of the driver during an impact collision.

BACKGROUND ART

A steering apparatus for an automobile, as illustrated in FIG. 26, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. In order to accomplish this, the steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9.

Construction for protecting a driver from a collision between the body of the driver and the steering wheel 1 during a collision accident is required in a steering apparatus. For example, by constructing the intermediate shaft 8 so that it can contract over its entire length due to an impact load, then when the steering gear unit 2 is displaced in the backward direction due to a primary collision between an automobile and another automobile or the like, that displacement is absorbed, which prevents the steering wheel 1 from displacing in the backward direction via the steering shaft 5 and hitting the body of the driver.

After the primary collision, a secondary collision occurs when the body of the driver collides with the steering wheel 1. Therefore, the steering apparatus for an automobile also requires construction that allows the steering wheel 1 to displace in the forward direction while absorbing impact energy. As this kind of construction, construction is known (refer to JP51-121929(U) and JP2005-219641(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 27 and FIG. 28 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 26) can be fastened to the portion on the rear end section of this steering shaft 5a that protrudes from the opening on the rear end of the steering column 6a. The steering column 6a and the housing 10 are supported by a fastening bracket 11 on the vehicle side (see FIG. 1) that is fastened to the vehicle body so that they can break away in the forward direction due to an impact load in the forward direction.

To accomplish this, a support bracket 12 on the column side that is supported in the middle section of the steering column 6a and a support bracket 13 on the housing side that is supported by the housing 10 are supported with respect to the vehicle body so that they both can break away in the forward direction due to an impact load in the forward direction. These brackets 12, 13 both comprise installation plate sections 14a, 14b at one or two locations, and notch sections 15a, 15b are formed in these installation plate sections 14a, 14b so that they are open on the rear end edges. With these notch sections 15a, 15b covered, sliding plates 16a, 16b are assembled in the portions of the support brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top plate section and a bottom plate section that are connected by a connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the notch sections 15a, 15b that are formed in these installation plate sections 14a, 14b.

The support brackets 12, 13 are supported by the fastening bracket 11 on the vehicle side by screwing nuts onto bolts or studs that are inserted through the notch sections 15a, 15b in the installation plate sections 14a, 14b and the through holes in the sliding plates 16a, 16b, and tightening the nuts. During a secondary collision, the bolts or studs come out from the notch sections 15a, 15b together with the sliding plates 16a, 16b, which allows the steering column 6a and the housing 10 to displace in the forward direction together with the support brackets 11, 12 and the steering wheel 1.

Moreover, in the example in the figure, energy absorbing members 17 are provided between the bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

During a secondary collision, the bolts or studs come out from the notch sections 15a, which allows the bracket 12 on the column side to displace in the forward direction, and the steering column 6a displaces in the forward direction together with this bracket 12 on the column side. When this happens, the bracket 13 on the housing side also breaks away from the vehicle body, and is allowed to displace in the forward direction. As the bracket 12 on the column side displaces in the forward direction, the energy absorbing members 17 plastically deform and absorb the impact energy that is transmitted from the driver's body to the bracket 12 on the column side by way of the steering shaft 5a and the steering column 6a, which lessens the impact applied to the body of the driver.

In the case of the construction illustrated in FIG. 27 to FIG. 29, the support bracket 12 on the column side is supported by the fastening bracket 11 on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

Moreover, in this construction, in the process of the housing 10 displacing in the forward direction together with the steering column 6a as a secondary collision advances, it becomes easy for the vertical position of the rear section of the steering column 6a to change excessively. The reason that it becomes easy for the vertical position of the rear section of the steering column 6a to change excessively as a secondary collision advances is that the support force from the support brackets 12, 13 is lost as the secondary collision advances.

For example, in the construction illustrated in FIG. 27 to FIG. 29, when the secondary collision advances and the support force from the support bracket 13 on the housing side is lost with respect to the fastening bracket 11 on the vehicle side, the steering column 6a tilts greater than the original angle of inclination as illustrated in FIG. 29 due to the existence of the heavy electric motor 18 that is fastened to and supported by the housing 10. In other words, the rear end section of the steering column 6a displaces upward more than the original position, and likewise the front end section displaces downward more than the original position. Furthermore, when the support force from the support bracket 12 on the column side is lost, the rear end section of the steering column 6a displaces upward even more. As a result, after the support force from both of the support brackets 12, 13 is lost, there is a possibility that the steering wheel 1 will be in a state of being excessively displaced upward, and when that happens, it becomes difficult to operate the steering wheel 1, and even though the vehicle that was in the accident can be moved on its own, this causes handling the vehicle after the accident to troublesome because it is difficult to drive the vehicle from the site of the accident to the side of the road.

In order to stabilize the breaking away of the steering column in the forward direction during a secondary collision, applying the construction disclosed in JP51-121929(U) can be somewhat effective. FIG. 30 to FIG. 32 illustrate the construction disclosed in JP51-121929(U). In the case of this construction, a locking notch 19 is formed in the center section in the width direction of a bracket 11a on the vehicle side that is fastened to and supported by the vehicle body and that does not displace in the forward direction even during a secondary collision, and this locking notch 19 is open on the edge of the front end of the fastening bracket 11a on the vehicle side. Moreover, a support bracket 12a on the column side is such that it is able to displace in the forward direction together with a steering column 6b during a secondary collision.

Furthermore, both the left and right end sections of a locking capsule 20 that is fastened to this support bracket 12a on the column side is locked in the locking notch 19. In other words, locking grooves 21 that are formed on both the left and right side surfaces of the locking capsule 20 engage with the edges on the both the left and right sides of the locking notch 19. Therefore, the portions on both the left and right end sections of the locking capsule 20 that exist on the top side of the locking grooves 21 are positioned on the top side of fastening bracket 11a on the vehicle side on both side sections of the locking notch 19. When the fastening bracket 11a on the vehicle side and the locking capsule 20 are engaged by way of the locking grooves 21 and the edges on both sides of the locking notch 19, locking pins 23 (see FIG. 32) are pressure fitted into locking holes that are formed in positions in these members 11a, 20 that are aligned with each other, joining the members 11a, 20 together. These locking pins 23 are made using a relatively soft material such as an aluminum alloy, synthetic resin or the like that will shear under an impact load that is applied during a secondary collision.

When an impact load is applied during a secondary collision from the steering column 6b to the locking capsule 20 by way of the support bracket 12a on the column side, these locking pins 23 shear. The locking capsule 20 then comes out in the forward direction from the locking notch 19, which allows the steering column 6b to displace in the forward direction together with the steering wheel 1.

In the case of the construction illustrated in FIG. 30 to FIG. 32, the engagement section between the locking capsule 20 that is fastened to the support bracket 12a on the column side and the fastening bracket 11a on the vehicle side is located at only one location in the center section in the width direction. Therefore, tuning for disengaging this engagement section and causing the steering wheel 1 to displace stably in the forward direction during a secondary collision becomes easy.

However, in this construction, in order to more completely protect the driver during a secondary collision, it is desired that the following points be improved. Namely, (1) in this construction the inner edges of the locking notch 19 that is formed on the side of the fastening bracket 11a on the vehicle side come in direct contact with the edges on both the left and right side of the locking capsule 20. During a secondary collision, the locking capsule 20 come out in the forward direction from the locking notch 19 while there is a friction between the inner edges of the locking notch 19 and the edges on both the left and right sides of the locking capsule 20. Therefore, in order for the locking capsule 20 to come out smoothly in the forward direction from the locking notch 19 in order to lessen the impact that is applied to the body of the driver during a secondary collision, it is necessary to keep the friction force that acts between the inner edges of the locking notch 19 and the edges on both the left and right sides of the locking capsule 20 low.

On the other hand, in order to maintain the necessary strength and rigidity, the fastening bracket 11a on the vehicle side is often made of a ferrous metal plate such as a carbon steel plate. Moreover, in regards to the locking capsule 20 as well, in order to sufficiently maintain reliability of the connecting sections with the fastening bracket 11a on the vehicle side and the support bracket 12a on the column side, the locking capsule 20 is often made of a metal material such as a ferrous metal including mild steel or an aluminum alloy. When the material of each part is selected in this way, there is metal contact in the frictional engagement sections between the inner edges of the locking notch 19 and the edges on both the left and right side of the locking capsule 20.

The friction coefficient between metal materials is relatively large, so in a state in which large contact pressure is applied to the frictional engagement sections, there is a possibility that the locking capsule 20 will not come out smoothly in the forward direction from the locking notch 19. For example, when a force is applied at an angle in the forward direction (as shown by arrows α and β in FIG. 4) to the locking capsule 20 due to a collision accident, a large contact pressure is applied to the frictional engagement section between the inner edges of the locking notch 19 and the edges on both the left and right sides of the locking capsule 20. As a result, the load required for the locking capsule 20 to come out in the forward direction from the locking notch 19 becomes large, and so the impact applied to the body of the driver when colliding with the steering wheel is increased by that amount.

(2) In this construction, it is not always possible to sufficiently reduce the break away load, which is the load required to cause the locking capsule 20 to come out in the forward direction from the locking notch 19 and to instantaneously start the forward displacement of the steering column 6b to which the locking capsule 20 is fastened when a secondary collision occurs. This is because, the distance L between the center axis of the steering column 6b, which is the position where the impact load acts, and the engagement section between the locking notch 19 in the fastening bracket 11a on the vehicle side and the locking grooves 21 of the locking capsule 20, which is the portion that breaks away during a secondary collision, is long. In other words, at the instant that a secondary collision occurs, a moment which is proportional to this distance L acts on the engagement section between these locking grooves 21 and the edges on both the left and right sides of the locking notch 19. When this kind of moment act on this engagement section, a force such as to pry open this engagement section acts, and there is a tendency for the friction in this engagement section to become large. This is disadvantageous from the aspect of keeping the break away load low and completely protecting the driver.

Moreover, a long distance L is also connected with an increase in the assembled height of the portion where the locking capsule 20 is located, which is disadvantageous from the aspect of making the steering column support apparatus compact and lightweight.

Furthermore, the locking capsule 20 has a shape in which the locking grooves 21 are provided in the center section in the thickness direction of the surfaces on both the left and right sides, so even when this locking capsule 20 is made using a synthetic resin, or is made using a metal, the processing costs increase. For example, in the case of using a synthetic resin, the injection mold is complex, and in the case using a metal, manufacturing using a simple forging process is difficult.

(3) In this construction, the length in the forward and backward direction of the locking notch 19 and the length in the forward and backward direction of the locking capsule 20 is the same, so as the secondary collision advances, the locking capsule 20 comes completely out from the locking notch 19. Therefore, when the secondary collision has advanced, it is not possible to prevent the steering wheel 1 from displacing excessively in the vertical direction. Therefore, there is room for improvement from the aspect of preventing difficult operation of the steering wheel 1 after an accident.

(4) In this construction, installation holes 24 are formed at a total of four locations, a front and rear location on both the left and right end sections of the fastening bracket 11a on the vehicle side. The fastening bracket 11a on the vehicle side is connected and fastened to a connection bracket 25 using these installation holes 24, and this connection bracket 25 is fastened to and supported by the vehicle body. Therefore, the rigidity of the connection section where the fastening bracket 11a on the vehicle side is fastened to the connection bracket 25 is sufficiently maintained. Moreover, by increasing the locations where this connection bracket 25 is fastened to and supported by the vehicle body, it is also possible to maintain the support rigidity of this connection bracket 25 by the vehicle body.

However, the installation locations for bolts and nuts increases, and thus the number of parts and assembly steps increases. Depending on the conditions of the vehicle body, there is a possibility that maintaining the rigidity of the portion where the connection bracket 25 is assembled to the vehicle body will also become difficult. More specifically, when the dimensions in the forward and backward direction of the installation surface on the vehicle side is limited, it may not be possible to support the connection bracket 25 by the vehicle body at multiple locations separated at intervals in the forward and backward direction, and thus it becomes difficult to maintain the rigidity of the portion where the connection bracket 25 is attached to the vehicle body. Taking this kind of situation into consideration, construction is desired that is able to maintain the support rigidity of the fastening bracket on the vehicle side with respect to this installation surface on the vehicle side, even when the dimension of this installation surface in the forward and backward direction is limited.

As technology related to a steering column support apparatus, an energy absorbing member is disclosed in JP2000-6821(A) that, in order to lessen the impact that is applied to the body of a driver that collides with the steering wheel 1 during a secondary collision, plastically deforms as the steering column 6 displaces in the forward direction together with the steering wheel 1. JP2007-69821(A) and JP2008-100597(A) disclose construction in which the position of the steering wheel 1 can be adjusted, and in order to increase the supporting force for keeping the steering wheel 1 in the adjusted location, a plurality of friction plates are placed overlapping each other to increase the friction surface. However, these documents do not disclose (1) technology for keeping the load required for the locking capsule that is supported by steering column to come out in the forward direction from the locking notch that is provided in the fastening bracket on the vehicle side small; (2) technology for keeping the break away load small; (3) technology for preventing excessive change in the vertical position of the steering wheel as a secondary collision advances; or (4) technology for maintaining support rigidity of the fastening bracket on the vehicle side with respect to an installation surface on the vehicle side even when the dimension in the forward and backward dimension of the installation surface is limited.

RELATED LITERATURE

Patent Literature

[Patent Literature 1] JP51-121929(U)
[Patent Literature 2] JP2005-219641(A)
[Patent Literature 3] JP2000-6821(A)
[Patent Literature 4] JP2007-69821(A)
[Patent Literature 5] JP2008-100597(A)

SUMMARY OF THE INVENTION

Problem to be Solved by the Invention

In consideration of the situation above, the object of the present invention is to provide construction of a steering column support apparatus for which tuning in order to stabilize forward displacement of the steering wheel during a secondary collision is simple, as well as to provide: (1) construction for keeping the load required for the locking capsule that is supported by steering column to come out in the forward direction from the locking notch that is provided in the fastening bracket on the vehicle side small; (2) construction for keeping the break away load small; (3) construction for preventing excessive change in the vertical position of the steering wheel as a secondary collision advances; (4) construction for maintaining support rigidity of the fastening bracket on the vehicle side with respect to an installation surface on the vehicle side even when the dimension in the forward and backward dimension of the installation surface is limited; and (5) construction that is able to keep the number of parts to a minimum, is able to simplify the work of processing, managing and assembling parts, is able to keep costs low, and is able to reduce the assemble height and maintain the freedom of design of the steering apparatus.

Means for Solving the Problems

The steering column support apparatus of the present invention comprises:

a fastening bracket on the vehicle side that comprises a locking hole that located in the center section in the width direction of the bracket and extends in the axial direction of a steering column, the bracket being fastened to and supported by a vehicle body such that the bracket does not displace in the forward direction during a secondary collision;

a support bracket on the column side that is supported by the steering column;

a locking capsule that comprises a base section having a width dimension that is equal to or less than the width of the locking hole, and a top section having a width dimension that is larger than the width dimension of the locking hole, and having flange sections on both ends in the width direction and that protrude further toward both sides in the width direction than the base section; where when the locking capsule is fastened to the support bracket on the column side, both end sections in the width direction of the base section are engaged in the locking hole, and the flange sections on the top section are located on the top side of the fastening bracket on the vehicle side in the portions on both sides of the locking hole; and a connecting member that is made of a material that shears due to an impact load that is applied during the secondary collision, and that, when the base section of the locking capsule is positioned on the inside of the locking hole, connects the locking capsule and the fastening bracket on the vehicle side.

In the steering column support apparatus of the present invention, the support bracket on the column side is supported by the fastening bracket on the vehicle side by way of the capsule and the connecting member such that the support bracket on the column side can displace together with the steering column due to an impact load that is applied during a secondary collision.

Particularly, in a first aspect of the steering column support apparatus of the present invention, a plurality of small through holes are formed in the flange sections of the locking capsule, small notch sections are formed in portions of part of the fastening bracket on the vehicle side that are aligned with the small though holes and open toward the inside of the locking hole, and the connecting member is provided such that the connecting member spans between these small through holes and the small notch sections.

Moreover, part of the material of the connecting member that shears due to the secondary collision penetrates between the inner surface of the locking hole and the surface of the locking capsule that faces the inner surface, and covers at least part of the space that exists between these surfaces.

In this first aspect, preferably the material of the connecting member is synthetic resin, and this connecting member is formed by injection molding that injects this synthetic resin into the small through holes and small notch sections, with part of this synthetic resin covering the entire length of the space that exists between the inner surface of the locking hole and the surface of the locking capsule that faces that inner surface.

Moreover, preferably, at least the edges on both the left and right sides of the rear half section of the locking hole are sloped toward each other going in the direction toward the rear.

In second to fourth aspects of the steering column support apparatus of the present invention, a plurality of small through holes are formed in the flange sections of the locking capsule, small holes or notch sections that are each open toward the inside of the locking hole are formed in portions of part of the fastening bracket on the vehicle side that are aligned with the small through holes, and synthetic resin is provided such that the synthetic resin spans between these small through holes and small notch sections, or between both these small through holes.

Particularly in the second aspect of the steering column support apparatus of the present invention, the locking capsule comprises only a base section (lower half section) and a top section (upper half section), where the bottom surface of the base section of the locking capsule comes in direct contact with the top surface of the support bracket on the column side, and the portions on part of the fastening bracket on the vehicle side that are on both sides of the locking hole are held between the bottom surface of the flange section and the top surface of the support bracket on the column side. This construction can also be additionally applied to the first aspect.

Furthermore, in the third aspect of the steering column support apparatus of the present invention, the length in the forward/backward direction of the locking hole is longer than the length in the forward/backward direction of the locking capsule, and is long enough that even when the locking capsule has displaced in the forward direction together with the steering column during a secondary collision, at least part of this locking capsule is positioned on the top side of the front end section of the fastening bracket on the vehicle side, and this locking capsule can be prevented from dropping. This construction can be applied to both the case where the locking hole has a notch shape that is open on the edge of the front end of the fastening bracket on the vehicle side, or the case where the locking hole has a closed hole shape that is closed on the edge of the front end of the fastening bracket on the vehicle side. Moreover, this construction can also be additionally applied to both the first aspect and second aspect.

Moreover, in the fourth aspect of the steering column support apparatus of the present invention, the fastening bracket on the vehicle side comprises a pair of left and right installation holes that are formed on opposite sides of the locking hole in positions in the forward/backward direction that coincide with each other. The fastening bracket on the vehicle side is fastened to and supported by the vehicle body by bolts or studs that are inserted though the installation holes. The position of a virtual line that connects the centers of these installation holes is located within the range of the engagement section between the edge sections on both the left and right sides of the locking capsule and the edge sections on both the left and right sides of the locking hole.

In this case, preferably the locking capsule and the support bracket on the column side are connected and fastened by second connecting members such as bolts, nuts and rivets that do not shear even during a secondary collision, on a pair of virtual lines that are parallel with the virtual line that connects the centers of the installation holes. The position in the forward/backward direction of the virtual line that connects the centers of the installation holes is between the virtual line on the front side, which passes through the centers of the front connecting members and that is parallel with this virtual line, and a virtual line on the rear side, which passes through the centers of the rear connecting members and that is parallel with this virtual line.

More preferably, the virtual line that connects the centers of the installation holes is located a center position between the front virtual line and the rear virtual line.

Even more preferably, an installation plate section is provided in the fastening bracket on the vehicle side such that, with the top surfaces of both end sections in the width direction of the this installation plate section, which are on the same plane as each other, in contact with an installation surface that is formed on the vehicle side, is connected and fastened to the vehicle body. By bending part of this installation plate section downward such that it does not interfere with the installation surface, the bending rigidity of this installation plate section is improved. In this case, it is possible to form the downward bending bent section such that the bent section is continuous around the enter length around the outer edge of the installation plate section except the edge on the front end. Alternatively, it is possible to form ribs at a plurality of locations in the forward/backward direction of the installation plate section, with these ribs protruding downward.

This fourth aspect can be additionally applied to any of the aspects 1 to 3.

In any of the aspects of the steering column support apparatus of the present invention, preferably the material of the connecting member also covers at least part of the space that exists between both the top and bottom surfaces of the fastening bracket on the vehicle side and the opposing surfaces.

Furthermore, the steering column support apparatus of the present invention can be applied to a steering apparatus that comprises at least one of a tilt mechanism for adjusting the up/down position of a steering wheel that is fastened to the portion of rear end section of the steering shaft that is supported on the inside of the steering column so that it can rotate freely that protrudes from the rear end section of the steering column, or similarly a telescopic mechanism for adjusting the forward/backward position of the steering wheel.

Advantages of the Invention

With the first aspects of the steering column support apparatus of the present invention, tuning for stabilizing forward displacement of the steering wheel during a secondary collision is simple, and the load required for the locking capsule that is supported by the steering column to come out in the forward direction from the locking notch that is formed in the fastening bracket on the vehicle side is kept low.

Moreover, with the second aspect of the steering column support apparatus of the present invention, it is possible to keep the break away load low, and it is further possible to reduce manufacturing costs of parts and make parts more compact and lightweight.

With the third aspect of the steering column support apparatus of the present invention, it is possible to prevent the excessive displacement in the up/down direction of steering wheel even when a secondary collision has advanced.

With the fourth aspect of the steering column support apparatus of the present invention, it is possible to maintain support rigidity of the fastening bracket on the vehicle side with respect to the installation surface on the vehicle side, even when the dimension in the forward/backward direction of this installation surface is limited.

BEST MODES FOR CARRYING OUT THE INVENTION

First Example of First Embodiment

Figure 26:
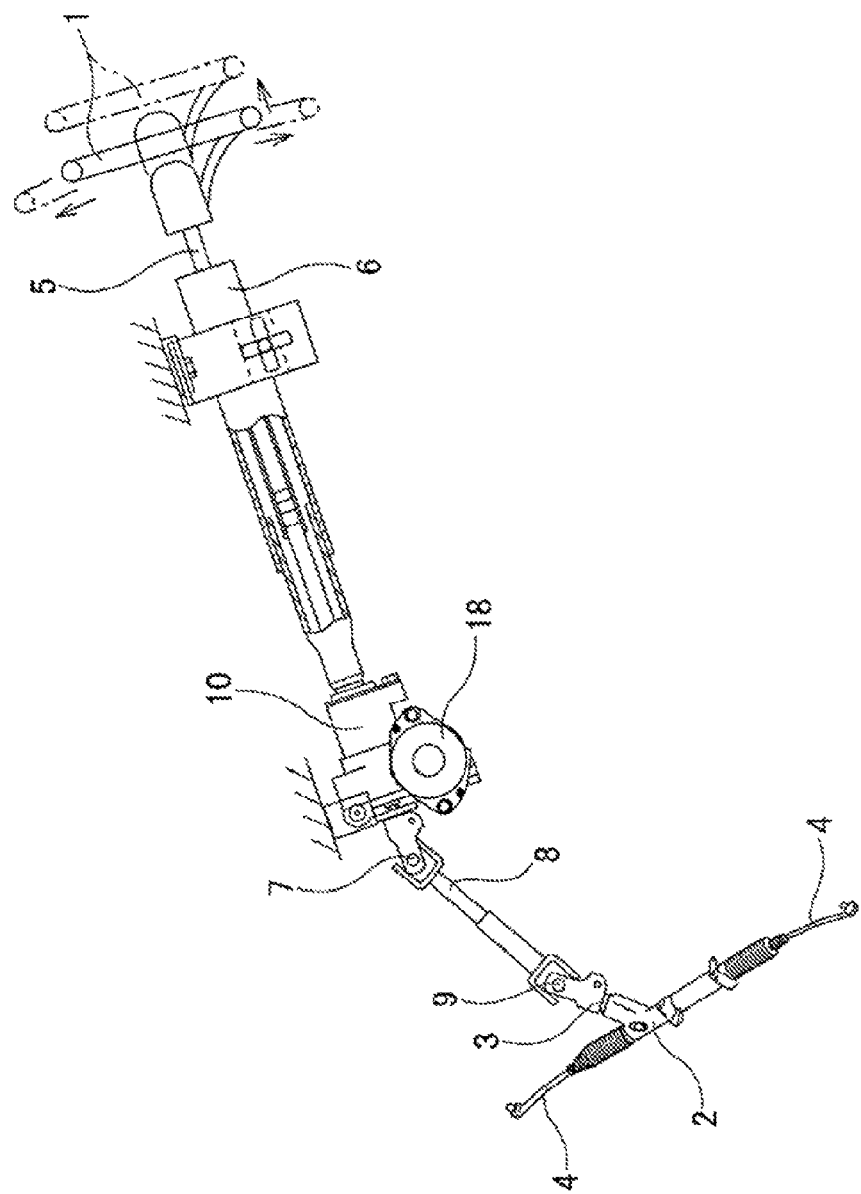
FIG. 26 is a partial cross-sectional view illustrating a first example of a conventionally known steering apparatus.
Figure 27:
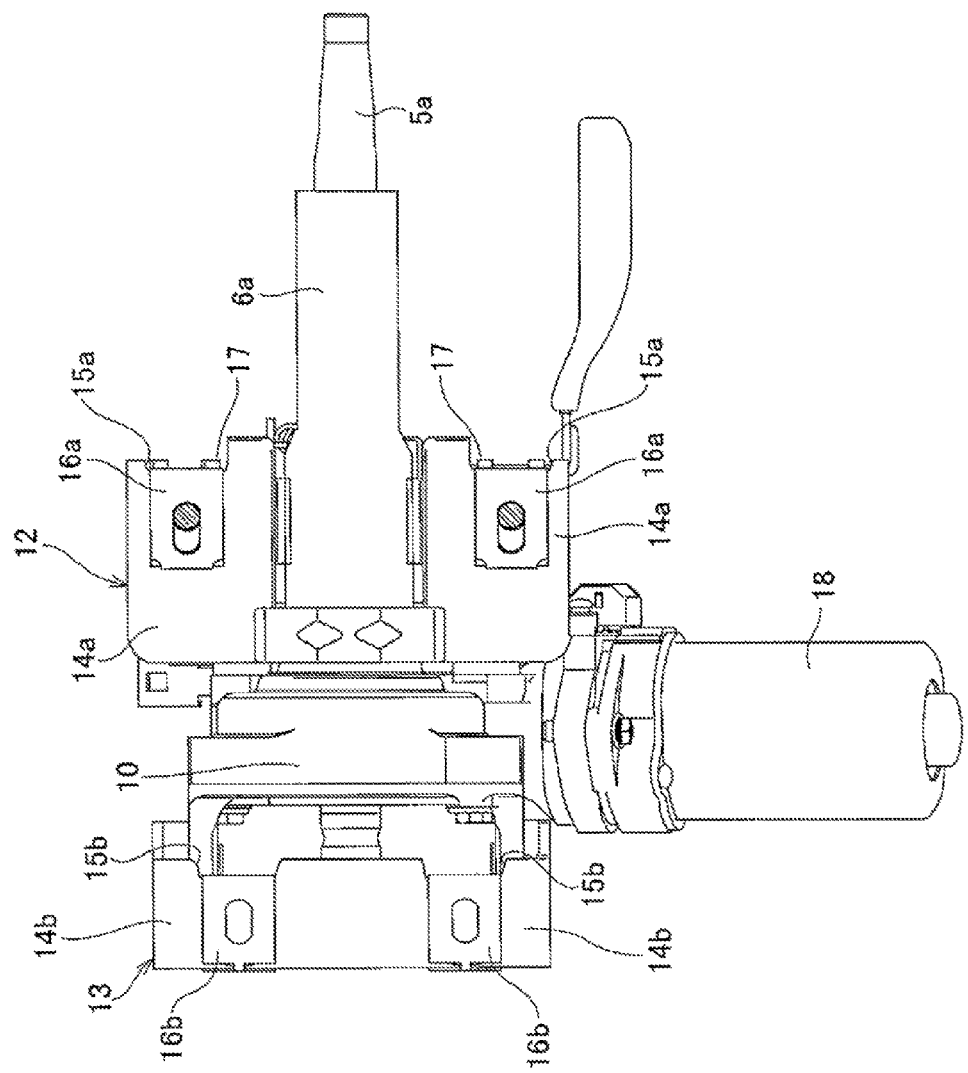
FIG. 27 is a top view illustrating the normal state of an example of a conventional steering column support apparatus.
Figure 28:
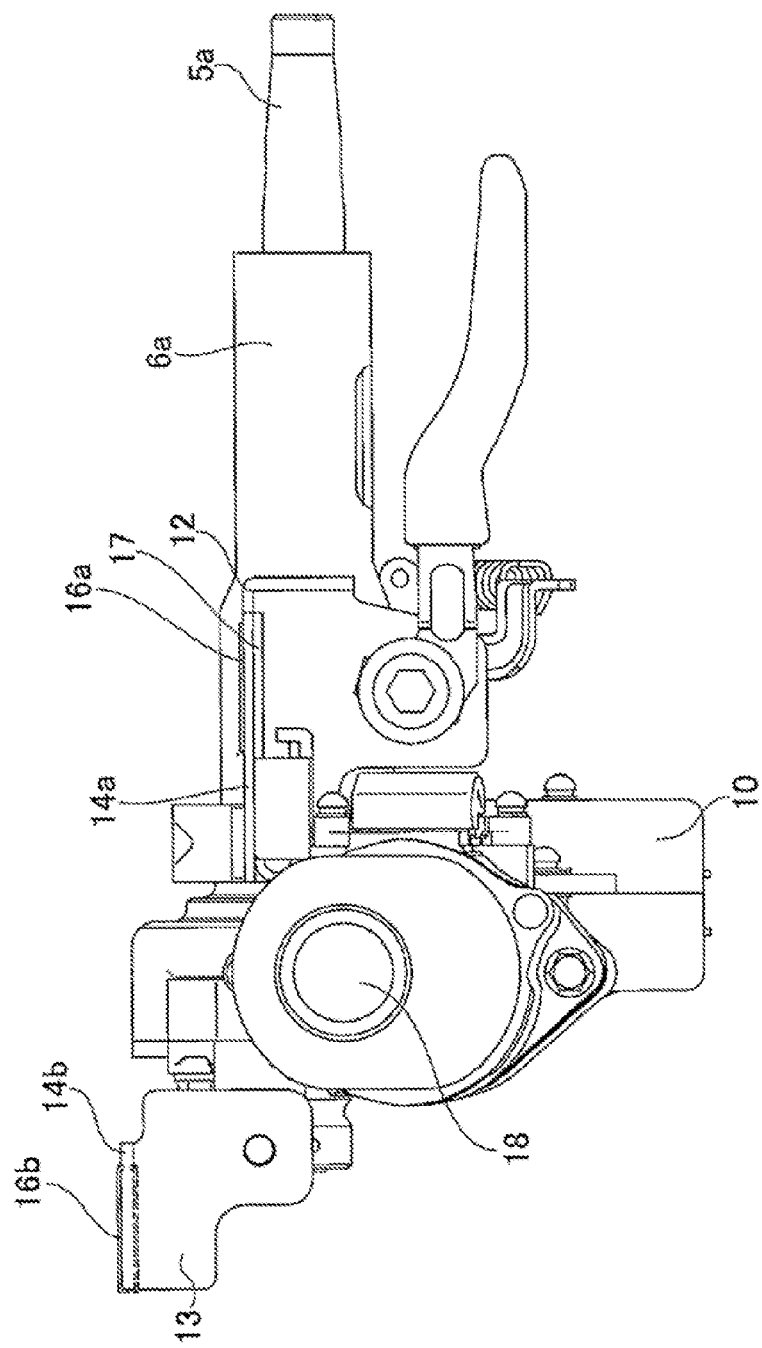
FIG. 28 is a side view of the example in FIG. 27.
Figure 29:
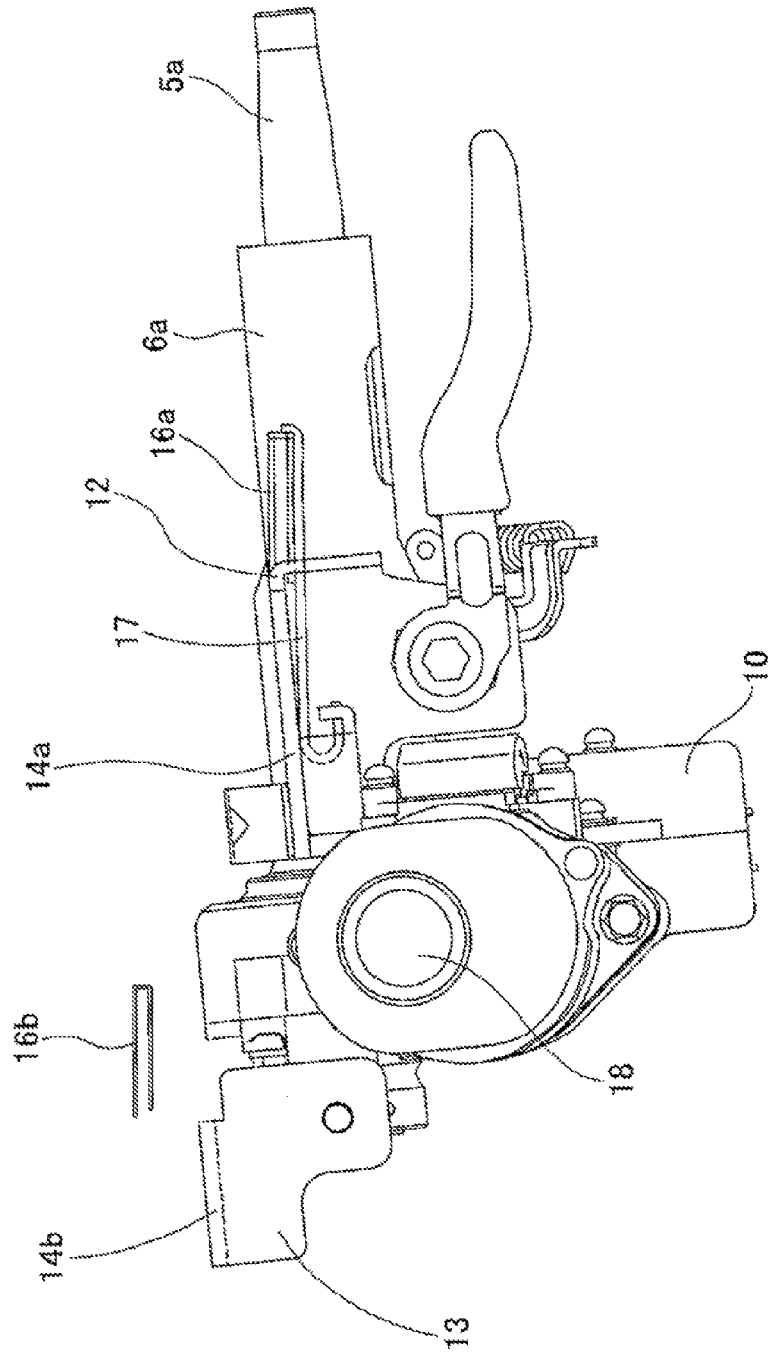
FIG. 29 is a side view for explaining the problem that occurs in the example in FIG. 27.

FIG. 1 to FIG. 5 illustrate a first example of a first embodiment of the present invention. This example illustrates the case of applying the present invention to a tilting and telescopic type steering apparatus that comprises a tilting mechanism for adjusting the vertical position of the steering wheel 1 in addition to a telescopic mechanism for adjusting the forward and backward position of the steering wheel 1 (see FIG. 26). Of these, the telescopic mechanism uses a telescopic shaped steering column 6c that can expand or contract along the entire length by fitting the rear section of an inner column 27 on the front side inside the front section of an outer column 28 on the rear side. A steering shaft 5b is supported on the inner diameter side of the steering column 6c such that it can be rotated freely.

The steering shaft 5b is made to be able to transmit torque as well as expand and contract by a spline fit between a male spline section that is formed around the rear section of a rod shaped inner shaft that is located on the front side, and a female spline section that is formed on the front section of a cylindrical shaped outer shaft 29 that is located on the rear side. With the rear end section of the outer shaft 29 protruding in the backward direction from the opening on the rear end of the outer column 28, the outer shaft is supported on the inner diameter side of this outer column 28 by a bearing such as a single-row deep groove type ball bearing 26 that is capable of supporting both a radial load and a thrust load such that only the rotation is possible. The steering wheel 1 is fastened to and supported by the rear end section of the outer shaft 29. When adjusting the forward/backward position of the steering wheel 1, the outer column 28 is displaced in the forward/backward direction together with the outer shaft 29, and the steering shaft 5b and steering column 6c are expanded or contracted.

A housing 10a for housing a reduction gear and the like of an electric power steering apparatus is connected and fastened to the front end section of the inner column 27 of this steering column 6c. An electric motor 18a, which is the auxiliary power source for the electric power steering apparatus, and a controller 30 for controlling the flow of electricity to this electric motor 18a are fastened to and supported by the top surface of the housing 10a. The housing 10a is supported by the vehicle body such that it can swivel around a horizontal shaft. In order for this, a support cylinder 31 is provided in the left/right direction on the upper front end of the housing 10a. Construction is employed of supporting the front end section of the steering column 6c by the vehicle body by a horizontal shaft such as a bolt that is inserted through a center hole 32 in the support cylinder 31 such that the rear end of this steering column 6c can swivel in the raising or lowering direction.

The inner diameter of the front half of the outer column 28 which constitutes the middle section and rear section of the steering column 6c can expand or contract elastically. In order for this, a slit 33 is formed in the axial direction on the bottom surface of the outer column 28. The front end section of this slit 33 opens up to a through hole 34 (see FIG. 2) in the circumferential direction that is formed on the edge of the front end of the outer column 28 or in the portion near the front end section of the outer column 28 except the top end section. A pair of thick plate-shaped supported plate sections 35 is located in the portion between both sides in the width direction of the slit 33. These supported plate sections 35 displace together with the outer column 28 when adjusting the position of the steering wheel 1, and function as support brackets on the displacement side.

In the case of this example, the supported plate sections 35 are supported by a support bracket 36 on the column side such that adjustment of the up/down position and forward/backward position is possible. This support bracket 36 on the column side is normally supported by the vehicle body, however, during a collision accident, breaks away in the forward direction due to the impact of a secondary collision, which allows displacement in the forward direction of the outer column 28. In order for this, the support bracket 36 on the column side is supported by a fastening bracket 11 on the vehicle side such that it can break away in the forward direction due to an impact load that is applied during a secondary collision.

With the steering wheel 1 held in the adjusted position, the supported plate sections 35 are held more firmly by a pair of left and right support plate sections 37 of the support bracket 36 on the column side. Long holes 38 in the up/down direction having a partial arc shape that are centered around the horizontal shaft that supports the support cylinder 31 with respect to the vehicle body are formed in these support plate sections 37, and long holes 39 in the forward/backward direction that are long in the axial direction of the outer column 28 are formed in the supported plate sections 35. An adjustment rod 40 is inserted through these long holes 38, 39. A head section 41 that is formed on the base end section (right end section in FIG. 3) of this adjustment rod 40 engages with the long hole in the up/down direction that is formed in one of the support plate sections 37 (right support plate section in FIG. 3) to prevent rotation, and only allows displacement along this long hole 38 in the up/down direction. On the other hand, a cam apparatus 45 having a driving cam 43 and a driven cam 44 is provided between the nut 42 that is screwed onto the tip end section (left end section in FIG. 3) of the adjustment rod 40 and the outside surface of the other support plate section 37 (left support plate section in FIG. 3). Of these cams, the driving cam 43 can be rotated and driven by an adjustment lever 46.

When adjusting the position of the steering wheel 1, the driving cam 43 is rotated and driven by rotating the adjustment lever 46 in a specified direction (downward), shortening the dimension in the axial direction of the cam apparatus 45. This widens the space between the inside opposing surfaces of the driven cam 44 and the head section 41, and releases the holding force that the support plate sections 37 apply to the supported plate sections 35. At the same time, the inner diameter of the portion on the front section of the outer column 28 in which the rear section of the inner column 27 is fitted elastically expands, which lowers the contact pressure that acts in the area of contact between the inner circumferential surface on the front section of the outer column 28 and the outer circumferential surface on the rear section of the inner column 27. In this state, the up/down position and the forward/backward position of the steering wheel 1 can be adjusted within the range in which the adjustment rod 40 can be displaced between the long holes 38 in the up/down direction and the long holes 39 in the forward/backward direction.

After the steering wheel 1 has been moved to a desired position, the dimension in the axial direction of the cam apparatus 45 is expanded by rotating the adjustment lever 46 in the opposite direction (upward) of the specified direction above. As a result, the space between opposing inside surfaces of the driven cam 44 and the head section 41 is shortened, and the supported plate sections 35 are held firmly by the support plate sections 37. At the same time, the inner diameter of the portion on the front section of the outer column 28 in which the rear section of the inner column 27 is fitted elastically contracts, and the contact pressure acting at the area of contact between the inner circumferential surface of the front section of the outer column 28 and the outer circumferential surface of the rear section of the inner column 27 increases. In this state, the steering wheel 1 is held in the adjusted up/down and forward/backward positions.

In this example, in order to increase the supporting force for holding the steering wheel 1 in the adjusted position, friction plate units 47 are held between the inside surfaces of the support plate sections 37 and the outside surfaces of the supported plate sections 35. These friction plate units 47 are formed by alternately overlapping one or a plurality of first friction plates having long holes that are aligned with the long holes 38 in the up/down direction, and one or a plurality of second friction plates having long holes that are aligned with the long holes 39 in the forward/backward direction, and serve the purpose of increasing the supporting force by increasing the friction area. The detailed construction and function of this kind of friction plate unit 47 is known from JP2007-69821(A) and JP2008-100597(A), and is not related to the gist of the present invention, so a detailed drawing and explanation are omitted.

Furthermore, the support bracket 36 on the column side breaks away in the forward direction with respect to the fastening bracket 11 on the vehicle side due to the impact load of a secondary collision, however, is supported so that it cannot drop downward even as the secondary collision advances. The fastening bracket 11 on the vehicle side is fastened to and supported by the vehicle body directly or indirectly, and does not displace in the forward direction during a secondary collision, and this bracket is formed by using a press to punch and bend metal plate, such as steel plate, having sufficient strength and rigidity. The fastening bracket 11 on the vehicle side comprises a flat installation plate section 56. The top surfaces of both end sections in the width direction of this installation plate section 56 are located on the same plane as each other. This kind of installation plate section 56 is fastened to and supported by the vehicle body by joining it to an installation surface 57 that is formed on the vehicle side, and inserting bolts or studs (not illustrated in the figure) into a pair of through holes 49 that are formed in both end sections in the width direction. A concave section 58 that is concave in the upward direction is formed in the center section of the installation surface 57 in order to prevent interference with the bolts 54 and nuts 55. However, the portions of the installation surface 57 on both the left and right sides of this concave section 58 that come in contact with the top surfaces of both end sections in the width direction of the installation plate section 56 are flat surfaces that are on the same plane.

The planar shape of the installation plate section 56 is nearly a pot shape. More specifically, the width dimension of the front half section is smaller than the width dimension of the rear half section, and of these, in the rear half section, the width dimension of the center section in the forward/backward direction is the largest, and the width dimension gradually becomes smaller in the direction going away from the center section in the forward/backward direction. A bent section 59 that is bent downward and that is continuous around the entire length is formed on the outer edge of this kind of installation plate section 56 except the edge on the front end. In other words, by bending the outer edge section except the front edge section of the installation plate section 56 downward so that there is no interference with the installation surface 57, and so that displacement in the forward direction of a locking capsule 50 is not hindered during a secondary collision, the bending rigidity of the fastening bracket 11 on the vehicle side that includes this installation plate section 56 is improved.

A locking hole (locking notch) 48 that extends in the axial direction (forward/backward direction) of the steering column 6c and that is open on the front edge is formed in the center section in the width direction of the fastening bracket 11 on the vehicle side whose bending rigidity has been improved in this way, and a pair of installation holes 49 are formed in locations in the rear half section on both the right and left side of the locking hole 48. This locking hole 48 is formed up to near the rear end section of the fastening bracket 11 on the vehicle side that is covered by the locking capsule 50. With this kind of fastening bracket 11 on the vehicle side aligned with the installation surface 57 that is formed on the vehicle body, the fastening bracket 11 is fastened to and supported by vehicle body by bolts or studs that are inserted through the installation holes 49. In other words, in the construction of this example, the fastening bracket 11 on the vehicle side is fastened to and supported by the vehicle body only by two bolts or studs that are inserted through the pair of left and right installation holes 49. In order to maintain the support rigidity of the fastening bracket 11 on the vehicle side with respect to the vehicle body, the forward/backward position of as virtual straight line A that connects the centers of the installation holes 49 is properly regulated. In this example, the locking hole 48 is formed as a locking notch that has a notch shape that is open on the front edge; however, it is also possible to form a closed hole that is closed on the front end side.

The support bracket 36 on the column side is connected to this kind of fastening bracket 11 on the vehicle side by way of the locking capsule 50 so that it can break away in the forward direction during a secondary collision. This locking capsule 50 is formed by plastic working such as forging of an iron alloy such as mild steel, die casting a light alloy such as an aluminum alloy or magnesium alloy, or injection molding of a high strength high functional polymer such as polyacetal. The width dimension in the left and right direction and the length dimension in the forward and backward direction are larger in the upper half section (top section) than in the lower half section (base section), and a flange section 51 that protrudes toward both sides and toward the rear is formed on the upper half section of the surfaces on both the left and right sides and the rear. With the lower half section of this kind of locking capsule 50 engaged with (fitted inside) the locking hole 48, the locking capsule 50 is supported by the fastening bracket 11 on the vehicle side such that it can break away in the forward direction due to an impact load that is applied during a secondary collision. In order for this, small through holes 52*a*, 52*b* are respectively formed at a plurality of location (8 locations in the example in the figure) in the flange section 51 and the peripheral edge of the locking hole 48 in part of the fastening bracket 11 on the vehicle side so that they are aligned with each other. Locking pins 53 are inserted into these pairs of small through holes 52*a*, 52*b*.

With the small through holes 52*a*, 52*b* aligned, these locking pins 53 can be formed by injection molding by injecting synthetic resin inside the aligned small through holes 52*a*, 52*b*, or pins can be formed into a cylindrical shape beforehand using synthetic resin or light metal alloy, and then pressure fitted into the small through holes 52*a*, 52*b* such that they span between these small through holes 52*a*, 52*b*. In either case, part of the synthetic material or light metal alloy material of the locking pins 53 is located between the top and bottom surfaces of the fastening bracket 11 on the vehicle side and the opposing surfaces, which are the bottom surface of the flange section 51 and the top surface of the support bracket 36 on the column side. Regardless of whether there is a space between these surfaces, vibration of the installation section of the support bracket 36 on the column side with respect to the fastening bracket 11 on the vehicle side is eliminated. Therefore, in order to completely close these spaces and completely eliminate this vibration, the locking pins 53 are preferably made by injection molding of synthetic resin.

Figure 1:
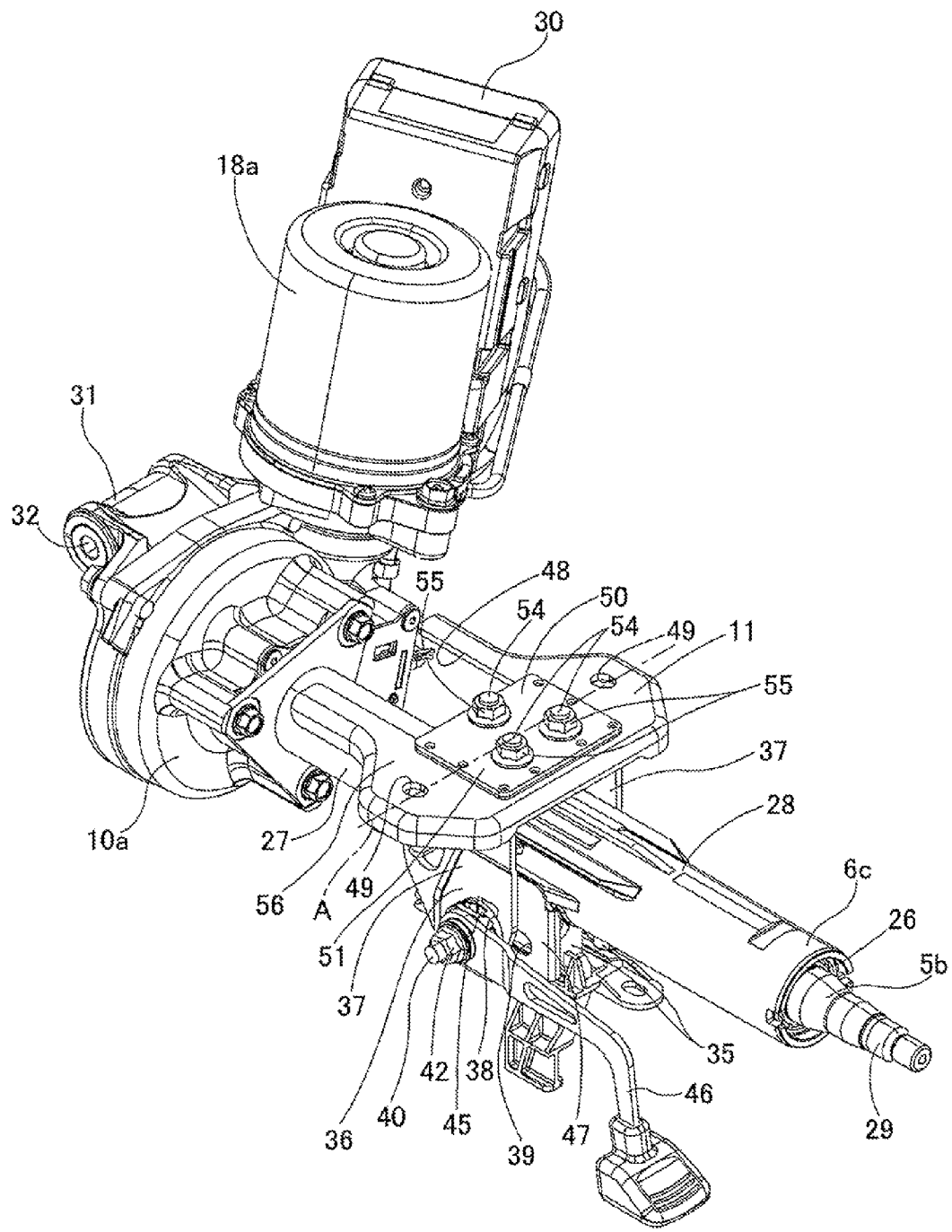
FIG. 1 is a perspective view illustrating a first example of a first embodiment of the present invention, and illustrates the state as seen from the upper rear.
Figure 2:
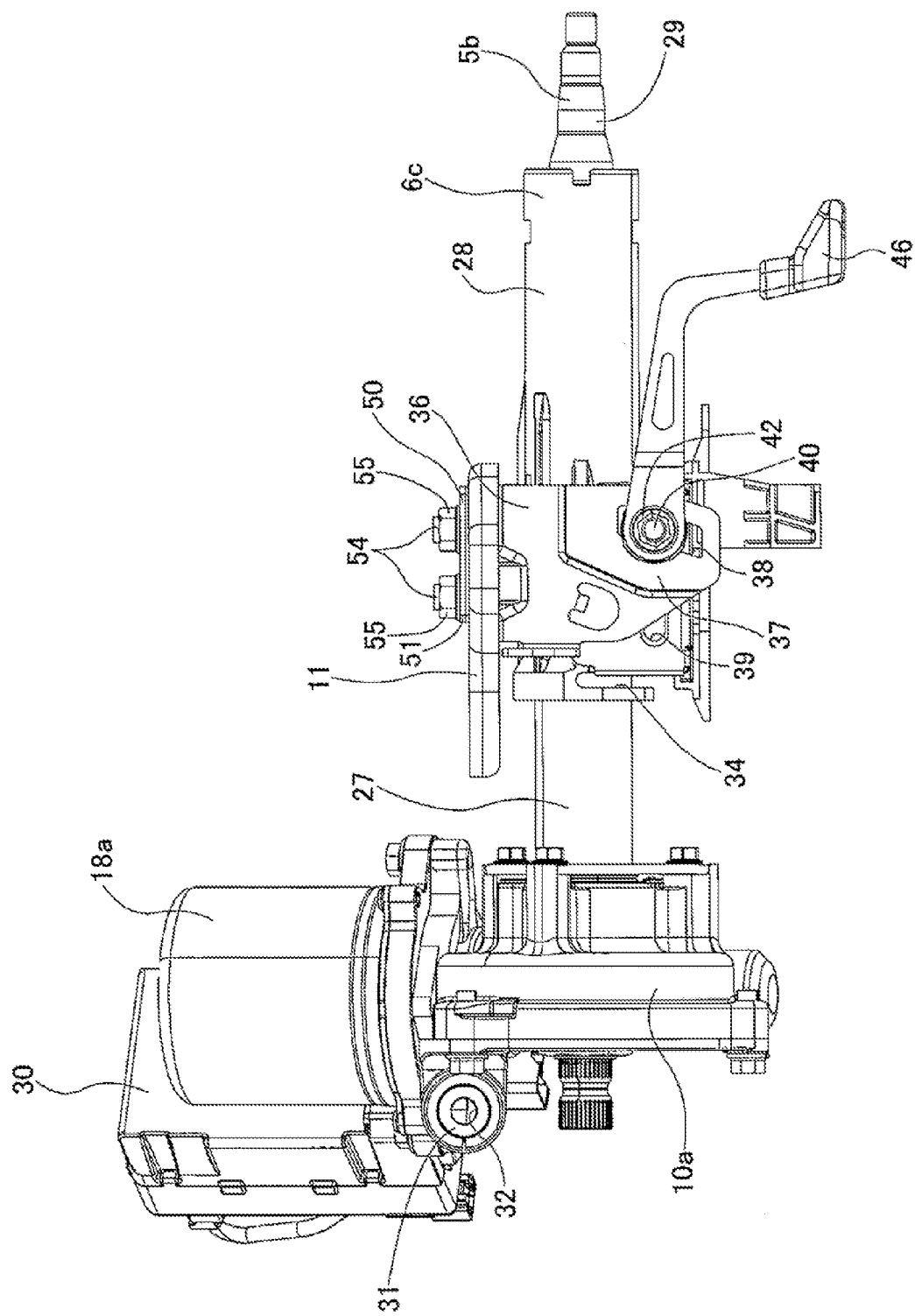
FIG. 2 is a side view of the first example of the first embodiment of the present invention.
Figure 3:
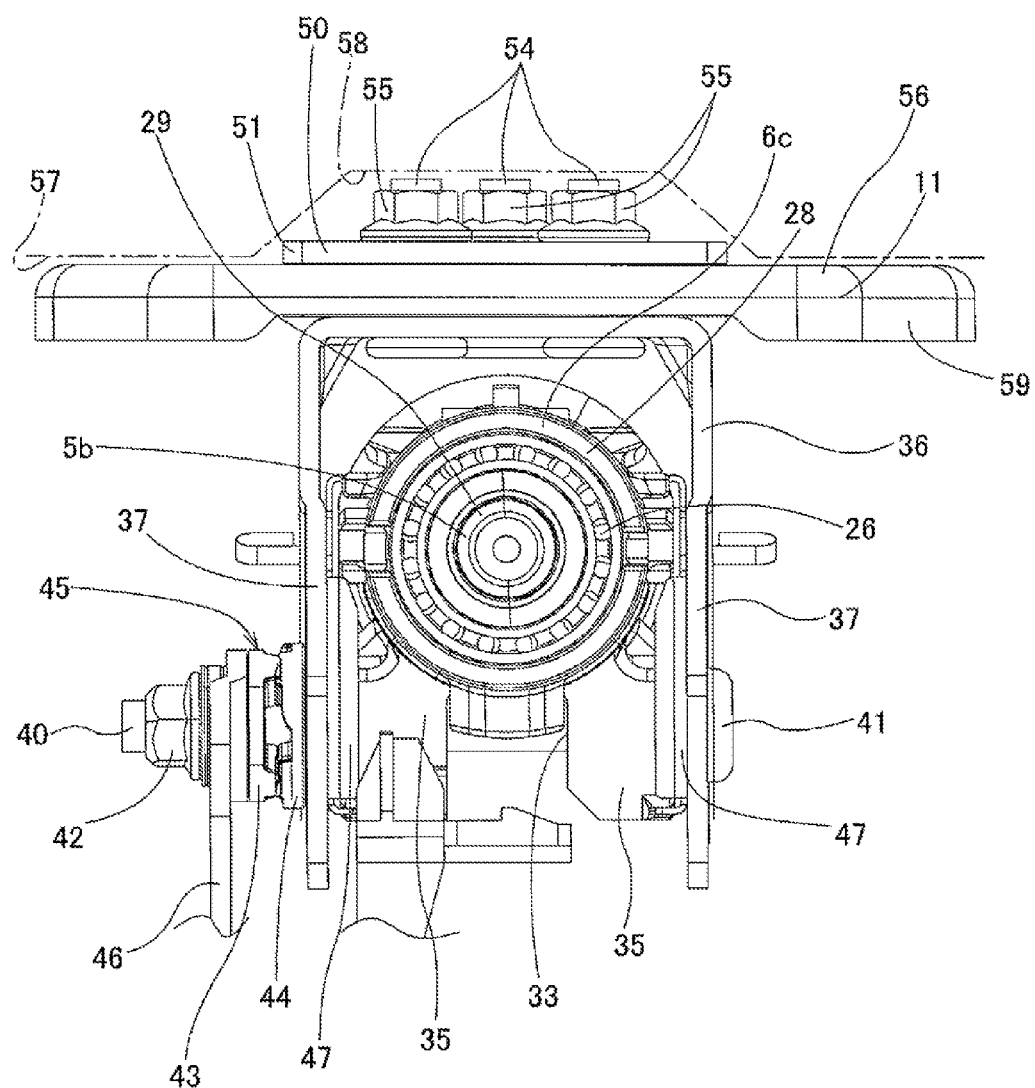
FIG. 3 is an orthographical view of the first example of the first embodiment of the present invention, and illustrates the state as seen from the rear, with part being omitted.
Figure 4:
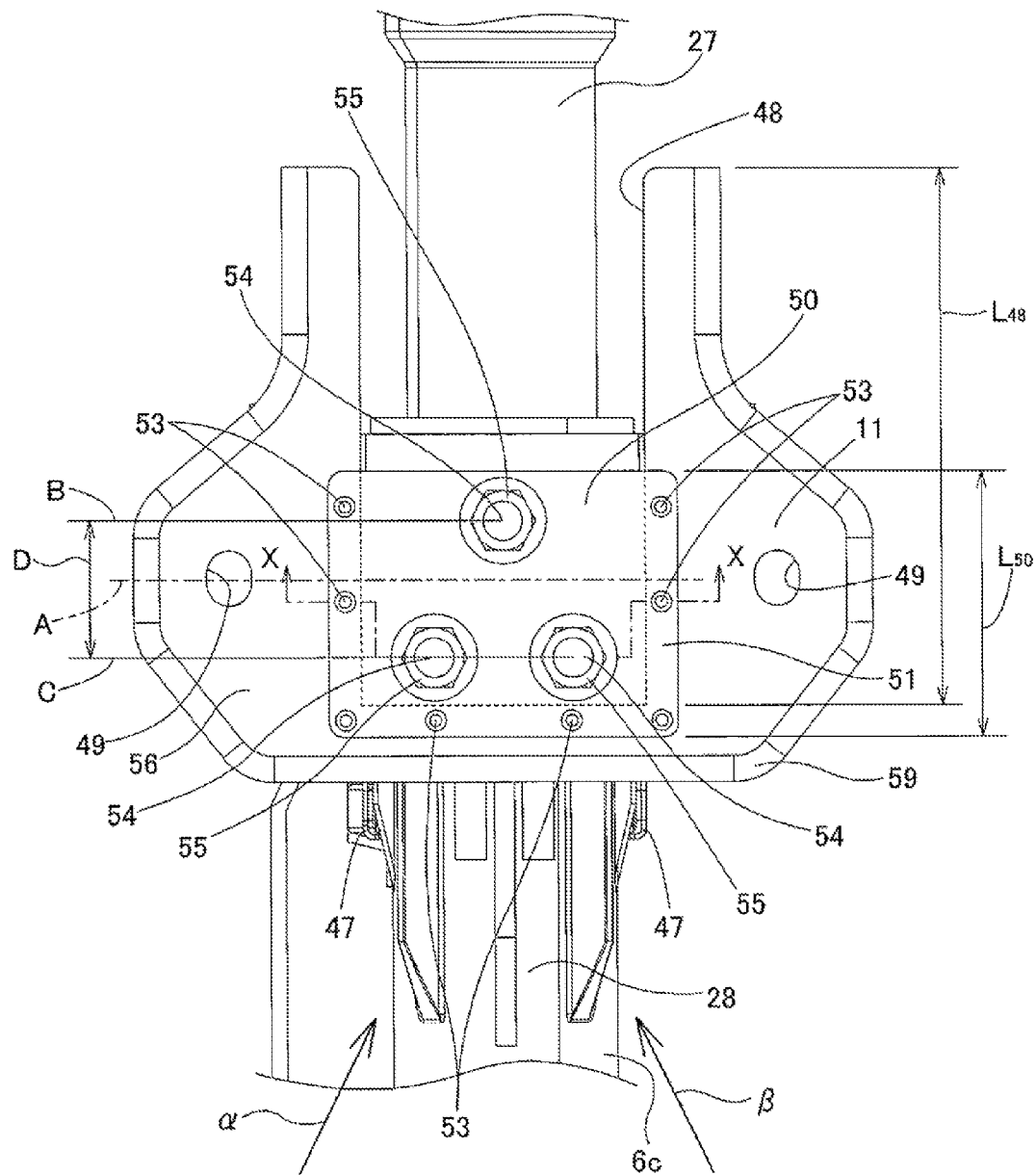
FIG. 4 is a top view of the first example of the first embodiment of the present invention, and illustrates the state as seen from above in FIG. 2.
Figure 5:
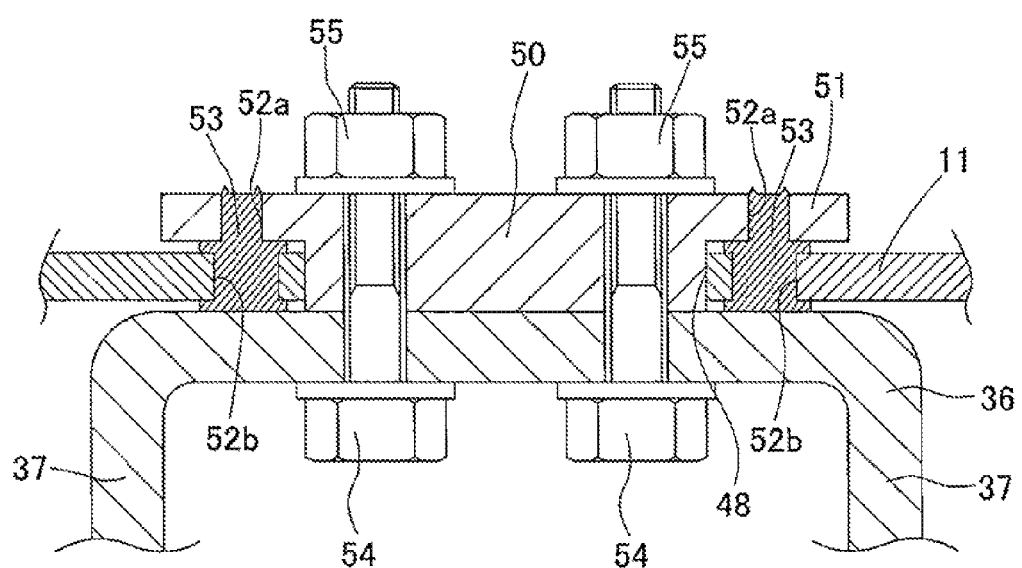
FIG. 5 is a cross-sectional view of the first embodiment of the first embodiment of the present invention, and is section X-X in FIG. 4 illustrating the construction of a connection section for the fastening bracket on the vehicle side and the support bracket on the column side.

The spaces existing between the top and bottom surfaces of the fastening bracket 11 on the vehicle side and the opposing surfaces, which are the bottom surface of the flange section 51 and the top surface of the support bracket 36 on the column side where part of the synthetic resin material or light metal alloy material is caused to penetrate, should be at least one space. In other words, the one of the surfaces of the top and bottom surfaces of the fastening bracket 11 on the vehicle side is brought into contact with the opposing surfaces, and part of the synthetic resin material or light metal alloy material can be caused to penetrate into only the space between the other surface and the opposing surfaces. In FIG. 5, for clarity, the height of the space, which is the cause of the vibration above, is drawn larger than the actual size.

When the locking pins 53 are formed by injection molding, the molten resin enters into the spaces between these surfaces, and then cools and becomes solidified, eliminating the vibration. On the other hand, when pins are pressure fitted, the portions in the middle in the axial direction of the pins that corresponds to the spaces expand outward in the radial direction due to the axial force that is applied to the pins, which eliminates the vibration due to the spaces between these surfaces. In either case, by spanning the locking pins between the small through holes 52*a*, 52*b*, the locking capsule 50 is supported by the fastening bracket 11 on the vehicle side such that it can break away in the forward direction due to an impact load that is applied during a secondary collision.

This kind of locking capsule 50 is connected and fastened to the support bracket 36 on the column side by a plurality bolts 54 and nuts 55 (three in the example in the figure) in a non-separated state regardless of any impact load. In other words, by inserting bolts 54 from the bottom through the through holes that are formed in aligned positions in the locking capsule 50 and support bracket 36 on the column side, and then screwing nuts 55 onto the portions on the tip end sections (top end sections) of the bolts 54 that protrude from the top surface of the locking capsule 50, and tightening the nuts 55, the locking capsule 50 and the support bracket 36 on the column side are connected and fastened together. Therefore, during a secondary collision, the impact load that is transmitted from the outer column 28 to this support bracket 36 on the column side is transmitted as is to the locking capsule 50, and when the locking pins 53 shear, the outer column 28 also displaces in the forward direction in synchronization with the displacement in the forward direction of the locking capsule 50. In the case of this example, the rear end sections of the locking capsule 50 and the support bracket 36 on the column side are connected and fastened by the two bolts 54 and nuts 55 on the left and right, and similarly the front end sections are connected and fastened by the bolt 54 and nut 55 in the center section. The forward/backward positions of the two bolts 54 on the left and right that connect the rear end sections are the same as each other.

The length $L_{48}$ in the forward/backward direction of the locking hole 48 that locks the locking capsule 50 that displaces in the forward direction together with the outer column 6*c* during a secondary collision is sufficiently larger than the length $L_{50}$ in the same direction of the locking capsule 50 ($L_{48} \gg L_{50}$). In the case of this example, length $L_{48}$ of the locking hole 48 is kept at two times greater or more than the length $L_{50}$ of the locking capsule 50 ($L_{48} \geq 2L_{50}$). During a secondary collision, even when the locking capsule 50 has displaced completely forward together with the outer column 28, or in other words, even when the locking capsule 50 has stopped displacing in the forward direction due to the impact load that was applied from the steering wheel 1, the portion of at least the rear end section of the flange section 51 of the locking capsule 50 that is capable of supporting the weight of the steering column 6*c* and support bracket 36 on the column side does not come out completely from the locking hole 48. That is, even when the secondary collision has advanced, the rear end section of the flange section 51 that is formed on the upper half section of the portions on both sides in the width direction of the locking capsule 50 is positioned on the top side of the front end section of the fastening bracket 11 on the vehicle side, and is able to prevent the locking capsule 50 from dropping down.

The forward/backward position of a virtual straight line A that connects the centers of the installation holes 49, or in other words, the centers of the bolts or studs (not illustrated in the figure) that are inserted into these installation holes 49 is set close to the position of the line of action (center of gravity) where the load applied from the steering column 6*c* to the fastening bracket 11 on the vehicle side via the locking capsule 50. More specifically, the virtual line A is within the range of the engagement section between the edge sections on both the left and right sides of the locking capsule 50 and the edge sections on both the left and right sides of the locking hole 48. In this example, the range of this engagement sections coincides with the range of the length $L_{50}$ in the forward/backward direction of the locking capsule 50. Preferably, the position in the forward/backward direction of the virtual line A is located between a virtual line B, which passes through the center of the front bolt 54 of the three bolts 54 and that is parallel with the virtual line A, and a virtual line C, which passes through the centers of the rear bolts 54 and that is parallel with the virtual line A, or in other words is within the range D illustrated in FIG. 4. More preferably, the virtual line A is in the exact center position between the virtual line B and virtual line C.

With the steering column support apparatus of this example, constructed as described above, tuning for stabilizing the forward displacement of the steering wheel 1 during a secondary collision is made simple, and it is possible to sufficiently stabilize the break away load that is required to start the displacement. Furthermore, even after the secondary collision has advanced, it is possible to prevent excessive downward displacement of the steering wheel 1.

First, simplifying tuning for stabilizing forward displacement of the steering wheel 1 during a secondary collision can be achieved by allowing the fastening bracket 11 on the vehicle side and locking capsule 50 to engage only in the center section in the width direction of the fastening bracket 11 on the vehicle side.

In other words, a single locking capsule 50 is located in the portion directly above the outer column 28, so the impact load that is transmitted from the steering wheel 1 to the locking capsule 50 by way of the outer shaft 29 and outer column 28 during a secondary collision is applied nearly uniformly to the locking pins 53 that connect the locking capsule 50 and the fastening bracket 11 on the vehicle side. That is, the impact load acts on the center section of the locking capsule 50 in the axial direction of the outer column 28. A force is applied in the direction that causes this single locking capsule 50 to come out in the forward direction from the locking hole 48. The locking pins 53 that join together the locking capsule 50 and the fastening bracket 11 on the vehicle side essentially shear at the same time. As a result, displacement in the forward direction of the outer column 28 that is connected to the locking capsule 50 by way of the support bracket 36 on the column side is performed stably without the center axis tilting excessively.

Particularly, in the case of the construction of this example, the shape of the locking capsule 50 is designed so that the bottom surface of the fastening bracket 11 on the vehicle side and the top surface of the support bracket 36 on the column side essentially come in direct contact with each other except for a minute space between them. Therefore, it is possible to shorten the distance between the connecting section between these brackets 11, 36 and the center axis of the outer column 28. For example, compared with the case of the conventional construction illustrated in FIG. 30, even when it is presumed that the construction and dimensions of the parts other than the locking capsules 20, 50 are the same, it is possible to shorten the distance by an amount equal to the thickness t (see FIG. 30) of the portion of the capsule 20 further below the locking groove 21. Therefore, at the instant when a secondary collision starts, a moment that is applied in a direction that increases the contact pressure at the area of contact between the both the top and bottom surfaces of the fastening bracket 11 on the vehicle side and the top surface of the support bracket 36 on the column side and the bottom surface of the flange section 51 is kept low. Therefore, it is possible to keep the break away load low and to more completely protect driver during a secondary collision.

Particularly, in the case of this example, a friction plate unit 47 for increasing the support force for holding the steering wheel 1 at an adjusted position is provided together with a tilting and telescopic mechanism for adjusting the up/down position and forward/backward position of the steering wheel 1. Providing the tilting and telescopic mechanism and the friction plate unit 47 not only are a cause for hindering smooth operation during adjustment of the steering wheel 1 due to an accumulation of manufacturing errors, they also make it easy for variation to occur in the break away load during a secondary collision. On the other hand, in this example, construction is employed that causes engagement between the single locking capsule 50 and the fastening bracket 11 on the vehicle side, so operation is not easily affected by the precision of the shape of the fastening bracket 11 on the vehicle side, and even though the precision of the shape of the fastening bracket 11 on the vehicle side is somewhat bad, it is possible to have smooth operation when performing the tilt and telescoping adjustment, and to suppress variation of the break away load of the fastening bracket 11 on the vehicle side. As a result, tuning for lessening the impact that is applied to the body of the driver that collides with the steering wheel 1 during a secondary collision is performed properly, and it becomes easier to more completely protect the driver.

Moreover, an energy absorbing member 17 that plastically deforms and absorbs impact energy due to displacement in the forward direction is provided between a portion that does not displace during a secondary collision, for example the fastening bracket 11 on the vehicle side, and the portion that displaces in the forward direction due to a secondary collision, for example, the outer column 28. This energy absorbing member 17 is also positioned in the center section in the width direction of the outer column 28 and effectively deforms plastically due to displacement in the forward direction of the outer column 28. Various known forms of this kind of energy absorbing member 17 are disclosed in JP2000-6821(A); however, because it is not related to the scope of the present invention, detailed drawings and an explanation are omitted.

Furthermore, in the case of this example, the distance between a virtual straight line A, which connects the center axes of the installation holes 49 for inserting bolts or studs for fastening the fastening bracket 11 on the vehicle side, and the point (load input point) where the load from the support bracket 36 on the column side is applied to the locking capsule 50 is kept small. Therefore, it is possible to reduce the moment that is applied from the fastening bracket 11 on the vehicle side to the bolts or studs that are inserted into the installation holes 49. Therefore, it is essentially possible to increase the rigidity of the supporting and fastening section of the fastening bracket 11 on the vehicle side with respect to the vehicle body. In other words, it is possible to make it difficult for the supporting and fastening section of the fastening bracket 11 on the vehicle side to displace with respect to the vehicle body due to a load that is applied from the support bracket 36 on the column side to the locking capsule 50.

Figure 30:
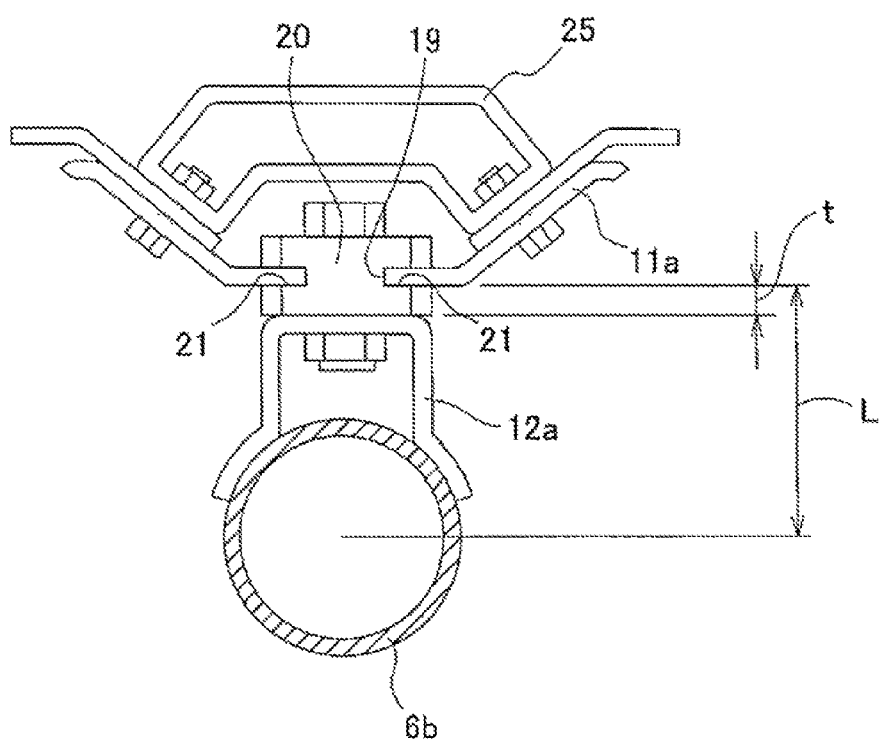
FIG. 30 illustrates an example of conventional construction, and is a cross-sectional view of a virtual plane that exists in a direction orthogonal to the center axis of the steering column.
Figure 31:
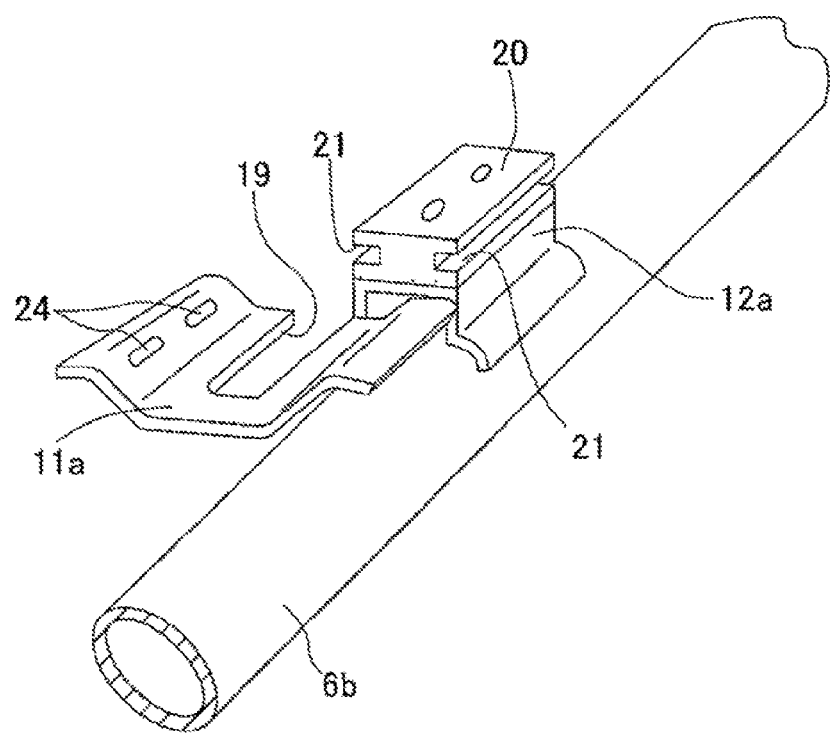
FIG. 31 is a perspective view of the example in FIG. 30, and illustrates the state before the fastening bracket on the vehicle side is connected with the support bracket on the column side.
Figure 32:
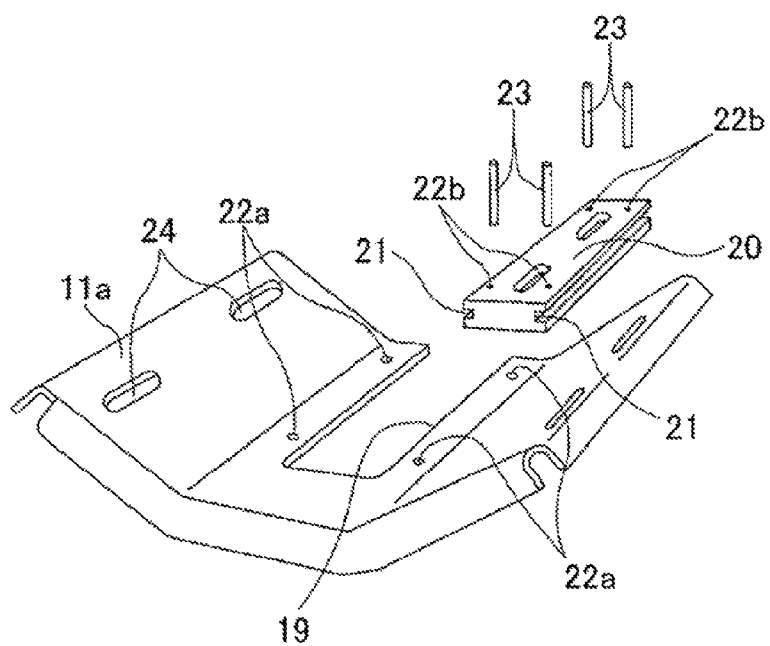
FIG. 32 is a drawing similar to FIG. 31 in which the connecting pins are depicted instead of the steering column being omitted.

Moreover, in the case of this example, the top surfaces of both end sections in the width direction of the installation plate section 56 of the fastening bracket 11 on the vehicle side are on the same plane, and these top surfaces of both end sections in the width direction are brought in contact with the installation surface 57 that is formed on the vehicle side. Therefore, it is possible to reduce the costs by simplifying the work of processing parts, the management of parts and assembly work, and to maintain the freedom of design by reducing the assembled height. In other words, with this construction, it is essentially possible to directly connect and fasten the fastening bracket 11 on the vehicle side to the vehicle body. Therefore, a member such as the connection bracket 25 that was assembled in the conventional construction illustrated in FIG. 30 is not needed, and thus it is possible to reduce costs and maintain design freedom. In order to make it possible for the fastening bracket 11 on the vehicle side to be fastened to and supported by the installation surface 57, the portion of the installation plate section 56 that attaches to the vehicle body is a flat plate shape, however in this example, the planar shape of this installation plate section 56 is pot shaped, and a bent section 59 is formed on the outer edge of the installation plate section 56 except for the edge on the front end, so it is possible to sufficiently maintain the bending rigidity of the fastening bracket 11 on the vehicle side that includes this installation plate section 56. Therefore, even when the top surfaces of both end sections in the width direction of the installation plate section 56 are on the same plane as each other, it is possible to maintain the rigidity of the fastening bracket 11 on the vehicle side, and to suppress vibration of the steering column 6c and the like that are supported by the vehicle body by way of this fastening bracket 11 on the vehicle side. As a result, it is possible to prevent making the driver who operates the steering wheel 1 that is supported by the steering column 6c via the steering shaft 5b uncomfortable.

Furthermore, preventing excessive downward displacement of the steering wheel 1 even when a secondary collision has advanced is achieved by making the length $L_{48}$ in the forward/backward direction of the locking hole 48 sufficiently longer than the length $L_{50}$ in the forward/backward direction of the locking capsule 50. In other words, these lengths $L_{48}$, $L_{50}$ are regulated in this way, so even when the secondary collision advances and the locking capsule 50 has completely displaced in the forward direction, not all of the locking capsule 50 comes out in the forward direction from the locking hole 48. Therefore, even when the secondary collision has advanced, it is possible to maintain the support force of the outer column 28, and to prevent the steering wheel 1 that is supported by the outer column 28 via the outer shaft 29 from excessive displacement downward. It is also possible to properly maintain a positional relationship between the steering wheel 1 and the body of the driver, and to prevent the steering wheel 1 from becoming difficult to operate after an accident.

As explained above, in the case of the construction of this example that provides features for stabilizing forward displacement of the steering wheel 1 during a secondary collision, and preventing the steering wheel 1 from dropping excessively even in the final stage of a secondary collision, the portion of the fastening bracket 11 on the vehicle side that supports the locking capsule 50 is a locking hole (locking notch) 48 that is open in the front. During a secondary collision, the outer column 28 that is connected to this locking capsule 50 by way of the support bracket 36 on the column side displaces in the forward direction together with this locking capsule 50. When this happens, the outer column 28 displaces in the forward direction while being guided by the inner column 27. Moreover, the housing 10a that is connected and fastened to the front end section of this inner column 27 is supported by the vehicle body by a horizontal shaft such as a bolt that is inserted through the center hole 32 in the support cylinder 31. Therefore, during a secondary collision, the outer column 28 displaces in the forward direction as is in a stable state. In other words, during a secondary collision, the steering wheel 1 is allowed to displace in the forward direction together with the outer column 28 as is in a stable state. As a result, it becomes easier to complete protect the driver.

Second Example of First Embodiment

Figure 6:
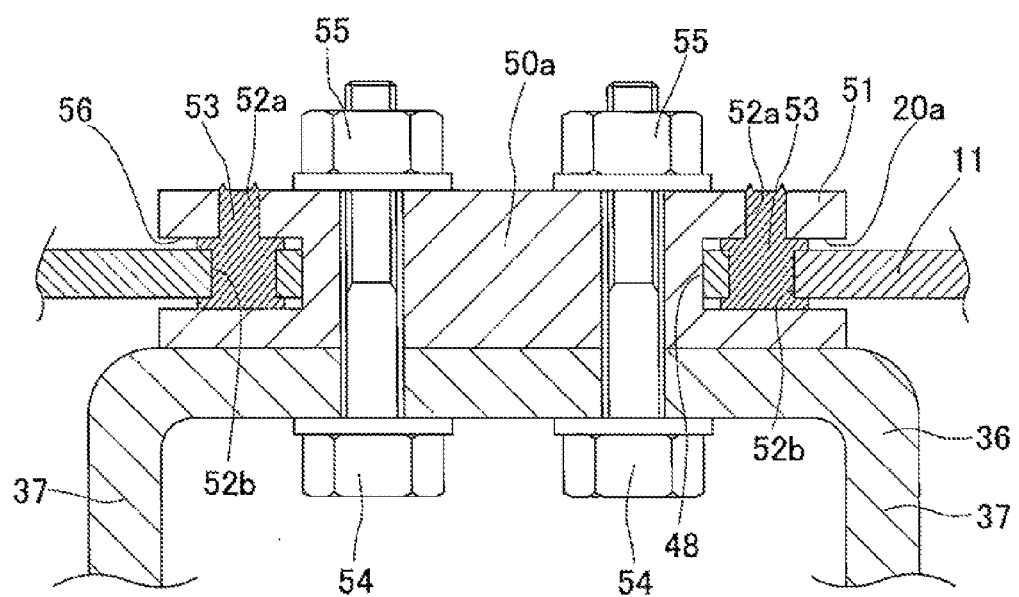
FIG. 6 is the same as FIG. 5 for a second example of the first embodiment of the present invention.

FIG. 6 illustrates a second example of the first embodiment of the present invention. In the first example, the shape of the locking capsule 50 is simple, making it possible to suppress manufacturing costs of the locking capsule 50, as well as keep the assembly height of the portion where the locking capsule 50 is located low. Together with contributing to lowering costs of the steering column support apparatus and making the steering column support apparatus more compact and lightweight, this kind of construction is also shortens the distance between the center axis of the outer column 28, which is where the impact load acts, and the engagement section between the fastening bracket 11 on the vehicle side and the locking capsule 50, which is the portion that breaks away during a secondary collision, so is advantageous from the aspect of suppressing the twisting that occurs as this distance becomes long, and stabilizing the break away load of the engagement section.

On the other hand, the construction of this second example is advantageous from the aspect of simplifying the injection molding of the locking pins 53. In other words, in the first example, it is necessary to perform injection molding of the locking pins 53 with the fastening bracket 11 on the vehicle side, the locking capsule 50 and support bracket 36 on the column side being connected by the bolts 54 and nuts 55. However, in this second example, only the fastening bracket 11 on the vehicle side and the locking capsule 50 need to be set in the die for injection molding of the locking pins 53, so the die can be easily be made more compact. In other words, the locking capsule 50a has locking grooves 21a on both the left and right side surfaces that are formed by a base section that coincides in the height direction with the locking grooves 21a, and upper sections and lower sections that comprise the upper and lower flange sections, and the edges on both sides of the locking hole 48 of the fastening bracket 11 on the vehicle side engage with these locking grooves 21a. Therefore, after the fastening bracket 11 on the vehicle side is connected with the locking capsule 50a by the locking pins 53, the locking capsule 50a can be connected and fastened to the support bracket 36 on the column side by the bolts 54 and nuts 55. Except for changing the shape of the locking capsule 50a, the other construction and functions are the same as in the first example of the first embodiment, so drawings of identical parts and any redundant explanation are omitted.

Third Example of First Embodiment

Figure 7:
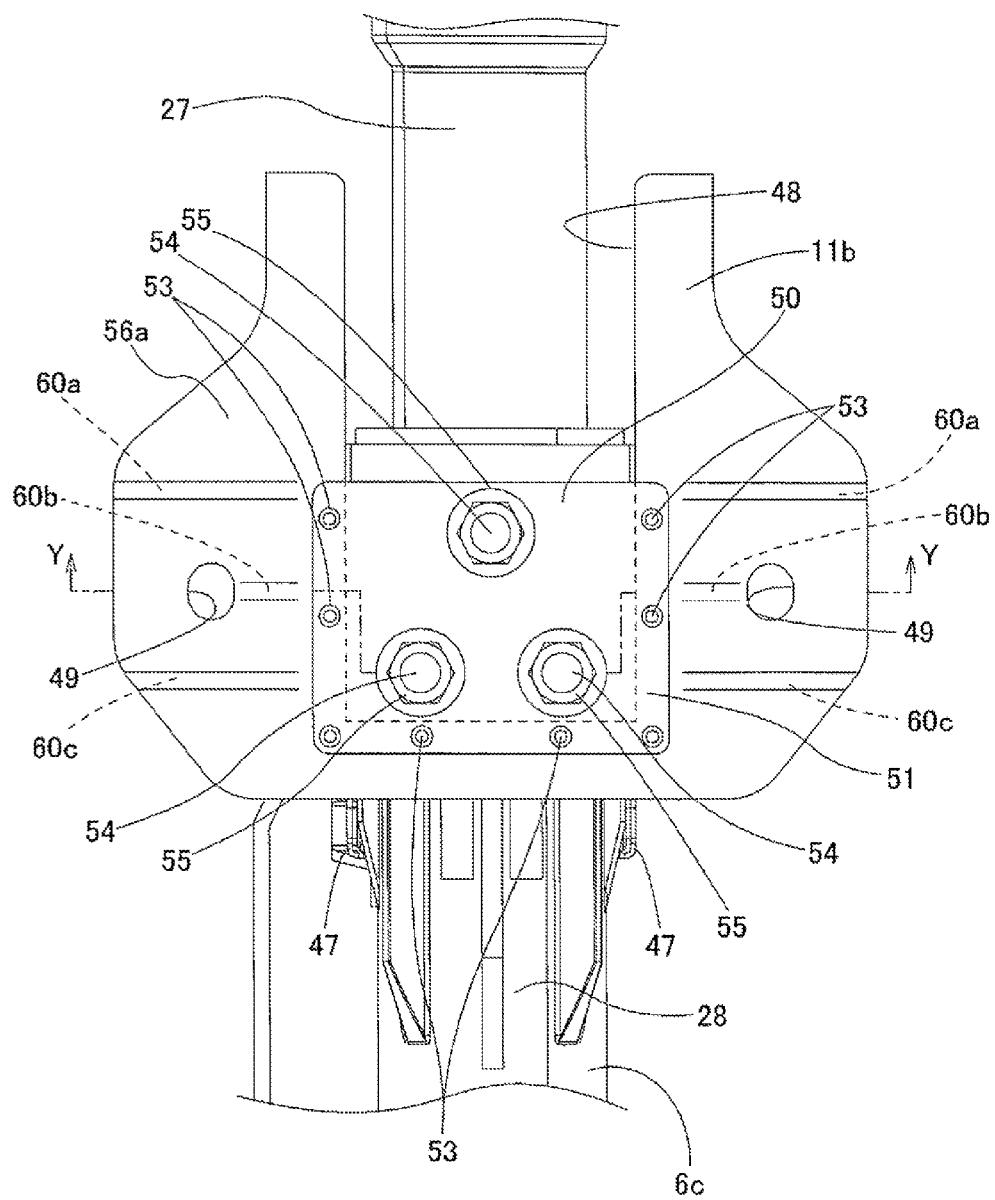
FIG. 7 is a top view illustrating a third example of the first embodiment of the present invention, and illustrates the state as seen from above.
Figure 8:
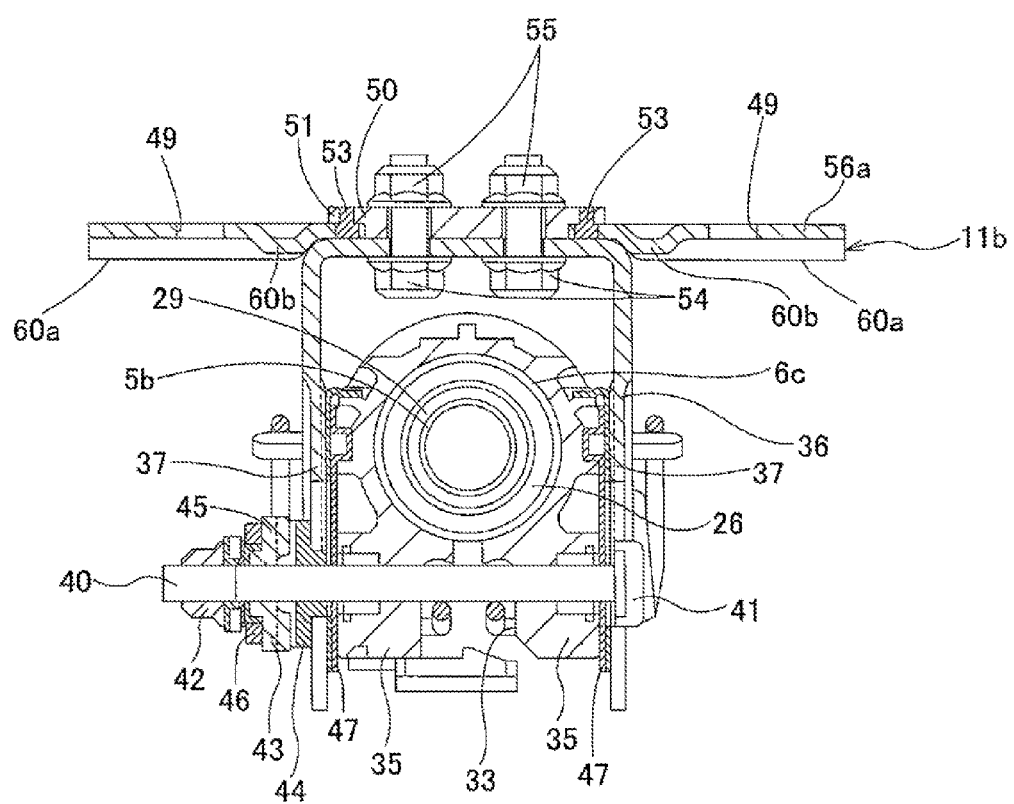
FIG. 8 is a cross-sectional view of section Y-Y in FIG. 7.
Figure 9:
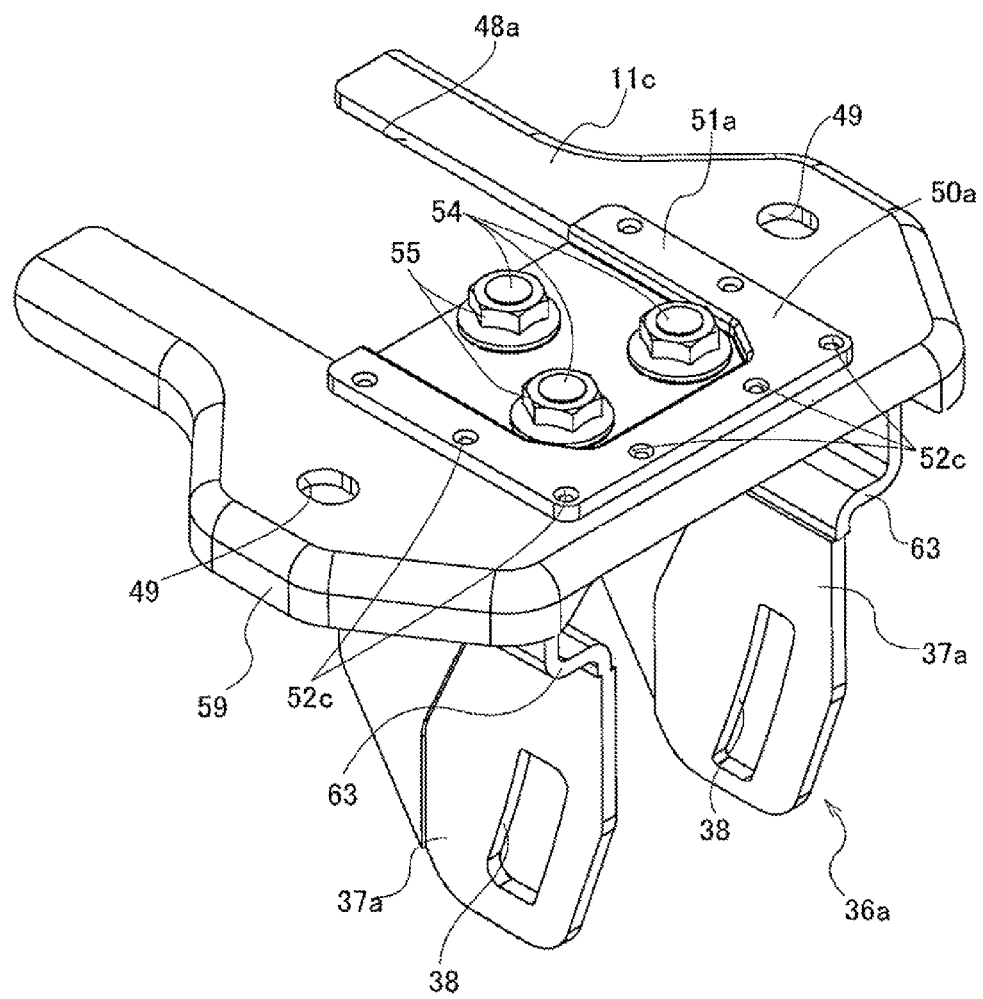
FIG. 9 is a perspective view of a first example of a second embodiment of the present invention, and illustrates the portion corresponding to the center section in FIG. 1, with part of the members omitted.
Figure 10:
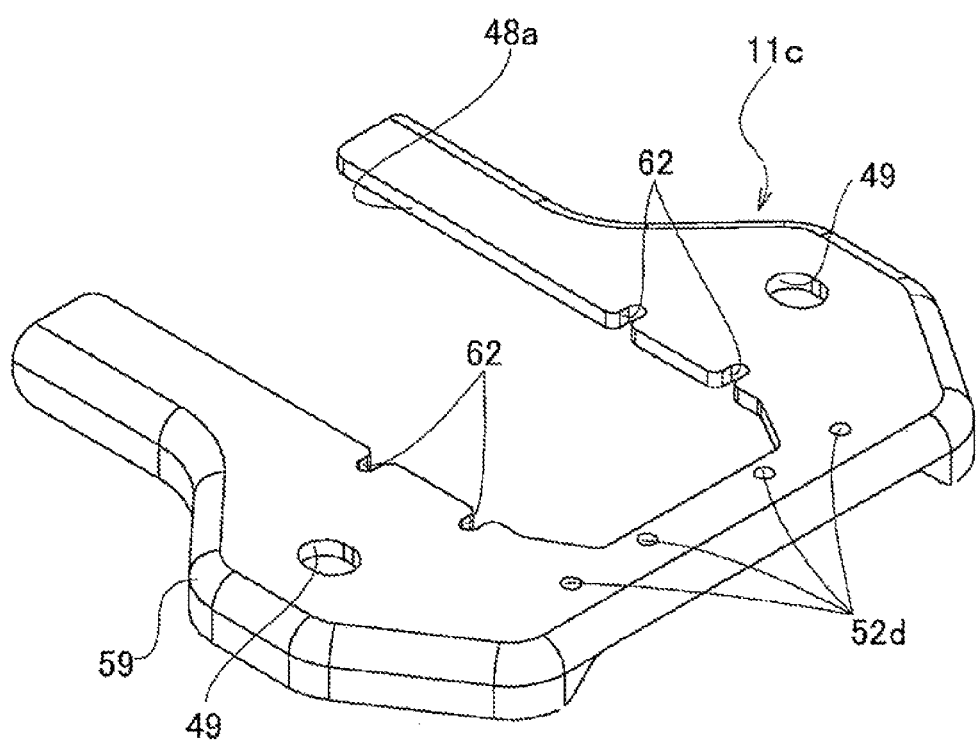
FIG. 10 is a perspective view of the removed fastening bracket on the vehicle side, and illustrates the state as seen in the same direction as in FIG. 9.
Figure 11:
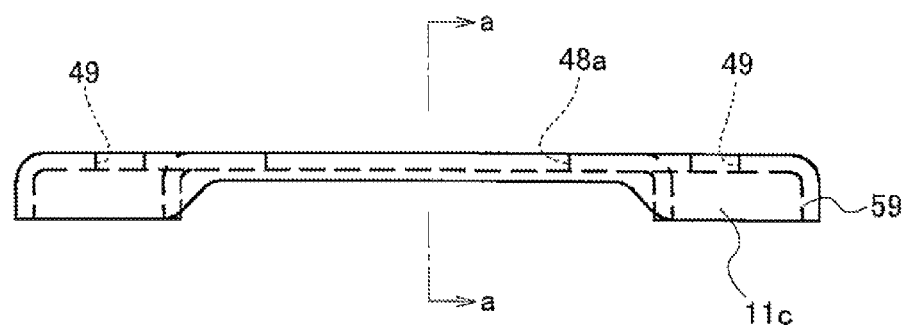
FIG. 11A is an orthographical view of the fastening bracket on the vehicle side in FIG. 10 as seen from the rear.
FIG. 11B is a cross-sectional view of section a-a in FIG. 11A.
Figure 11:
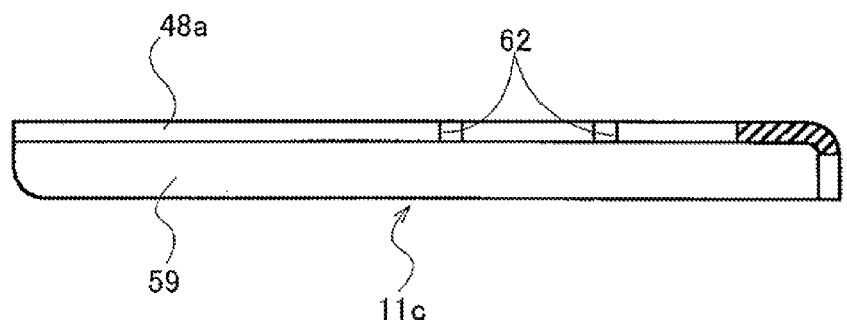
Figure 12:
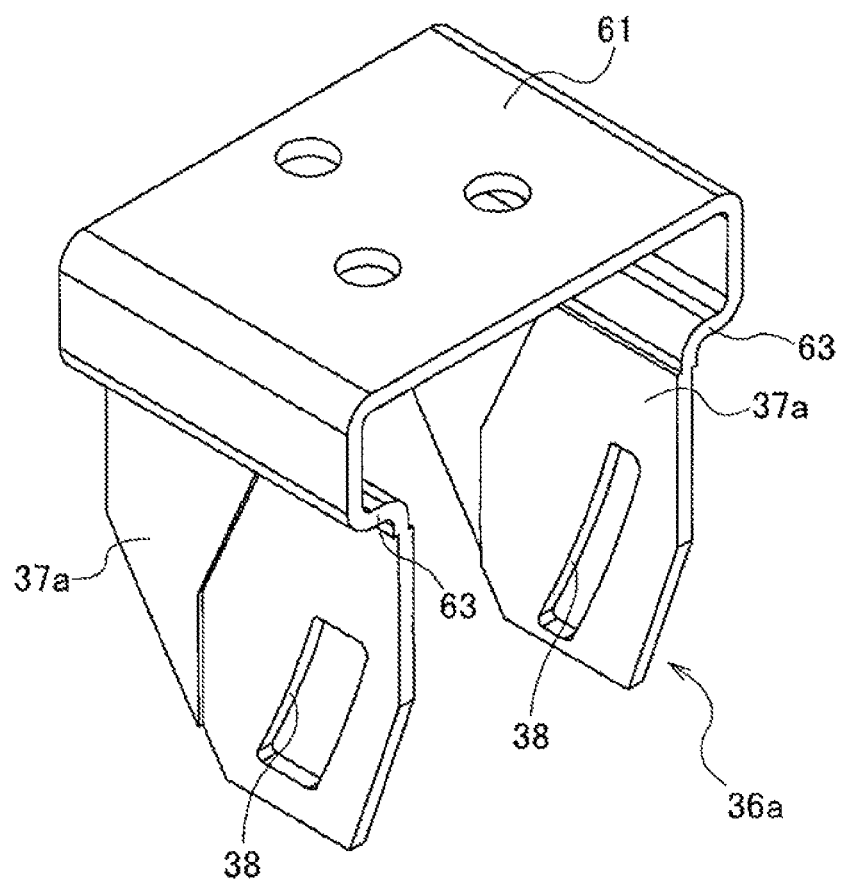
FIG. 12 is a perspective view of the removed support bracket on the column side, and illustrates the state as seen in the same direction as in FIG. 9.
Figure 13:
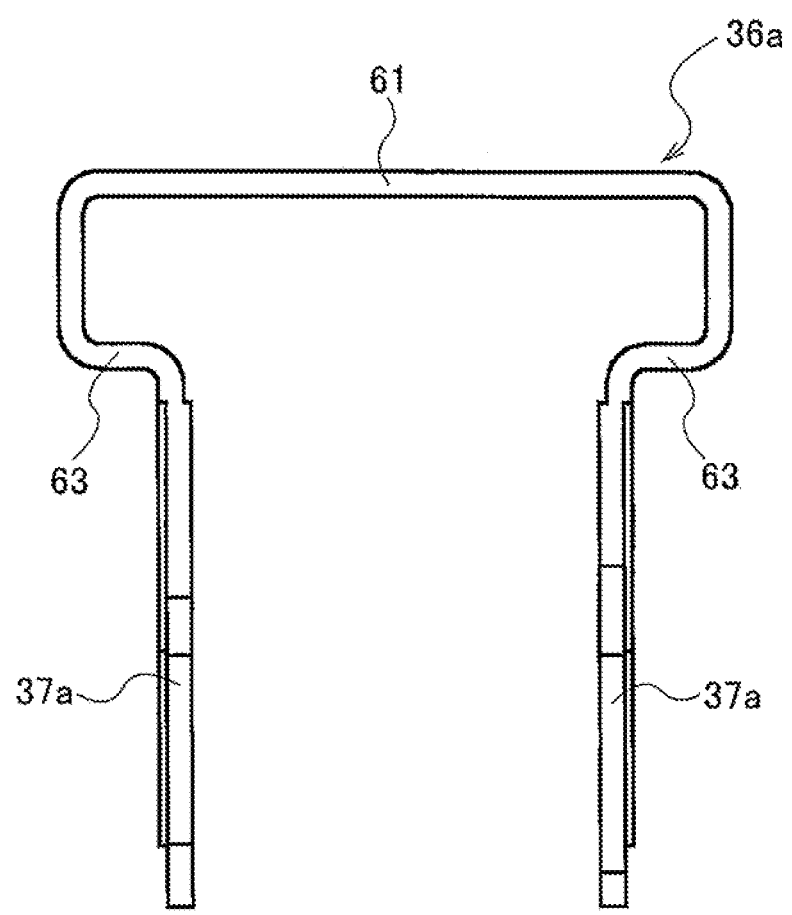
FIG. 13 is an orthographical view of the support bracket on the column side in FIG. 12 as seen from the rear.
Figure 14:
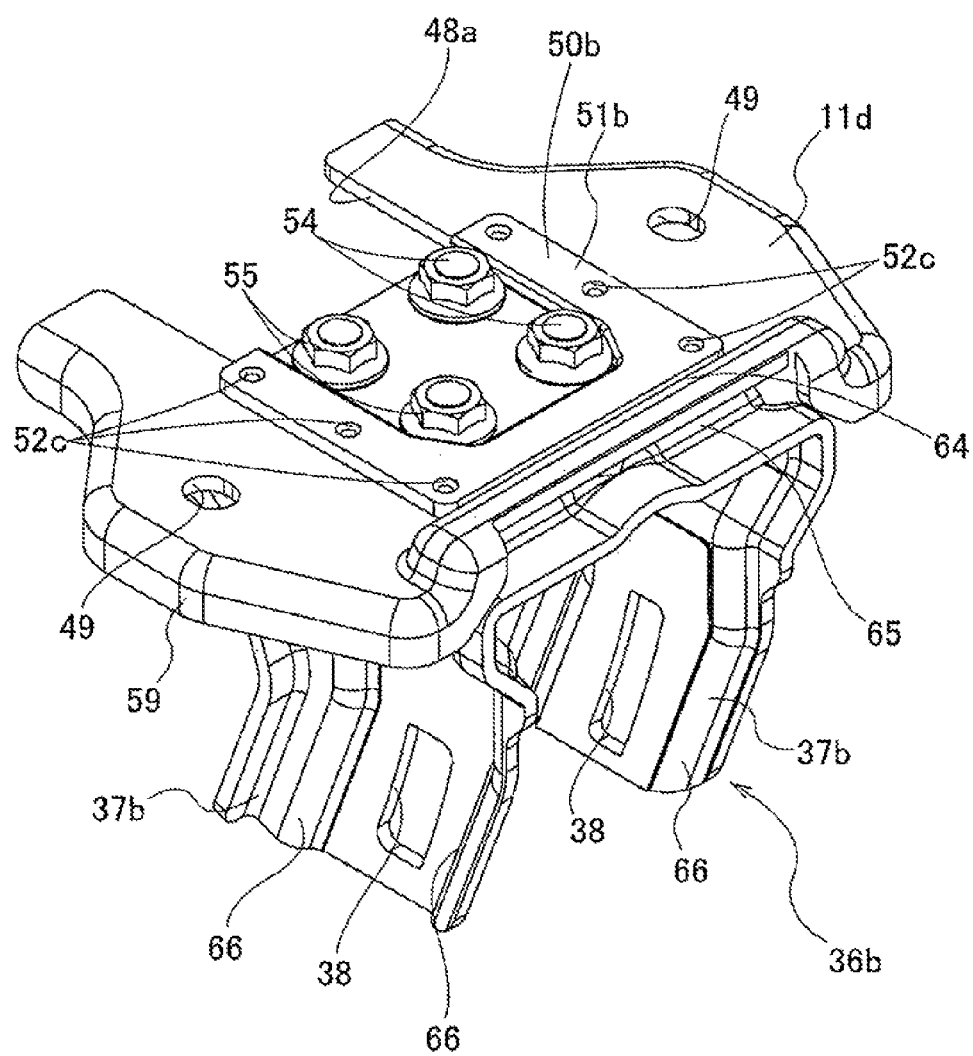
FIG. 14 is a drawing similar to FIG. 9, and illustrates a second example of the second embodiment of the present invention.
Figure 15:
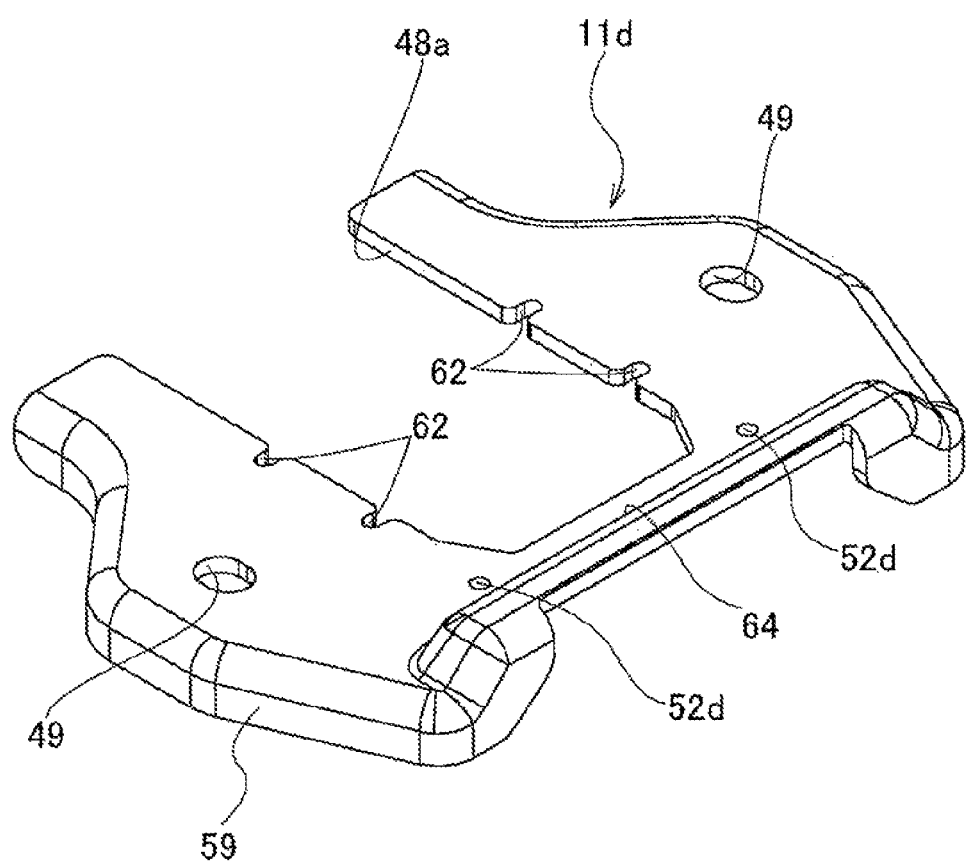
FIG. 15 is a perspective view of the removed fastening bracket on the vehicle side, and illustrates the state as seen in the same direction as in FIG. 14.
Figure 16:
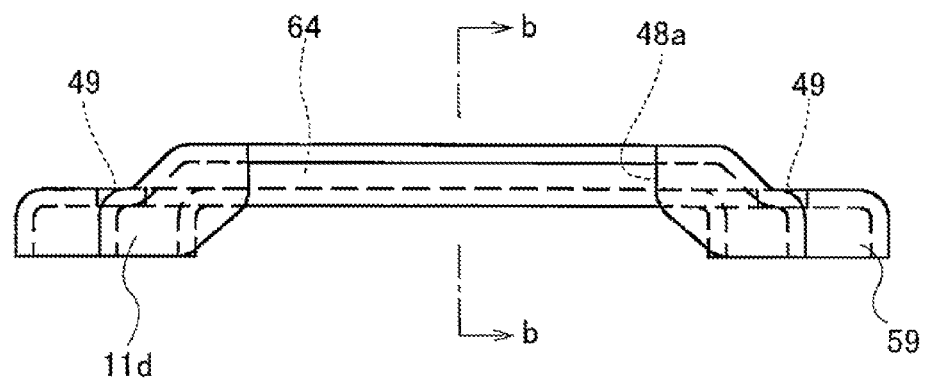
FIG. 16A is an orthographical view of the fastening bracket on the vehicle side in FIG. 15 as seen from the rear.
FIG. 16B is a cross-sectional view of section b-b in FIG. 16A.
Figure 16:
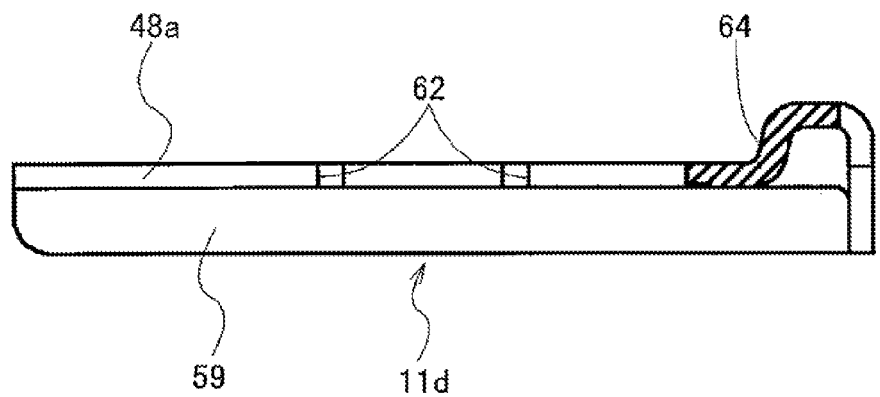
Figure 17:
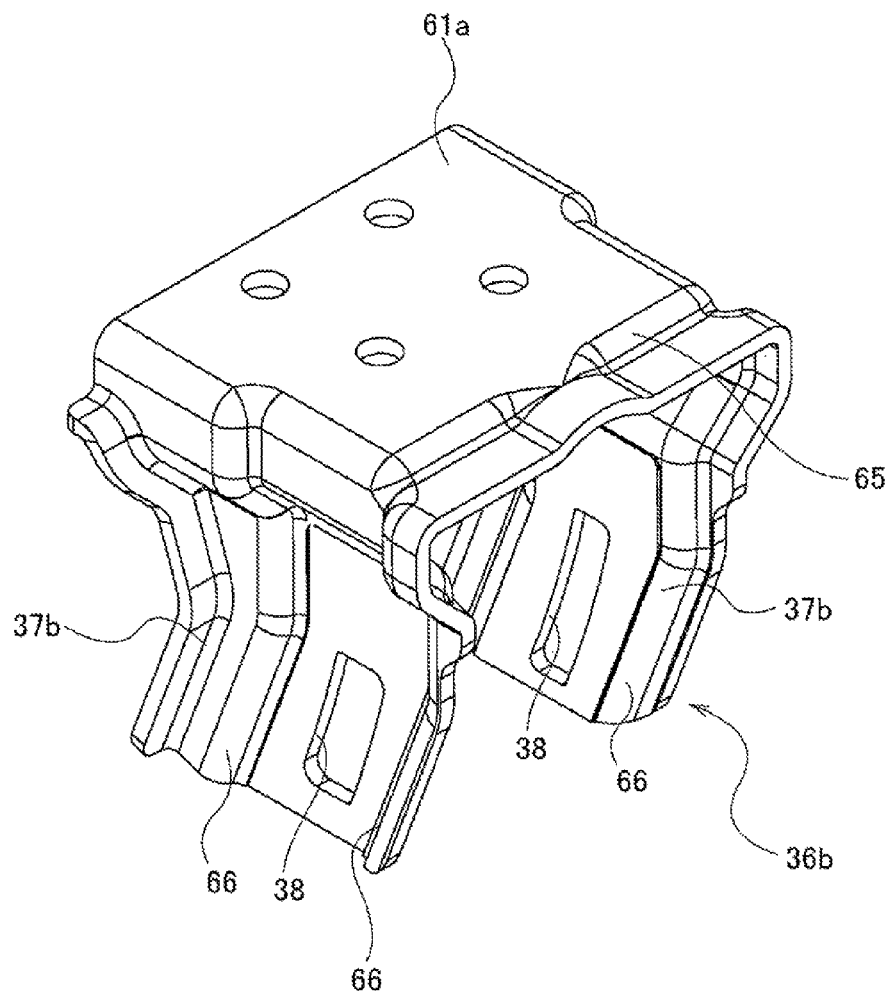
FIG. 17 is a perspective view of the removed support bracket on the column side, and illustrates the state as seen in the same direction as in FIG. 10.
Figure 18:
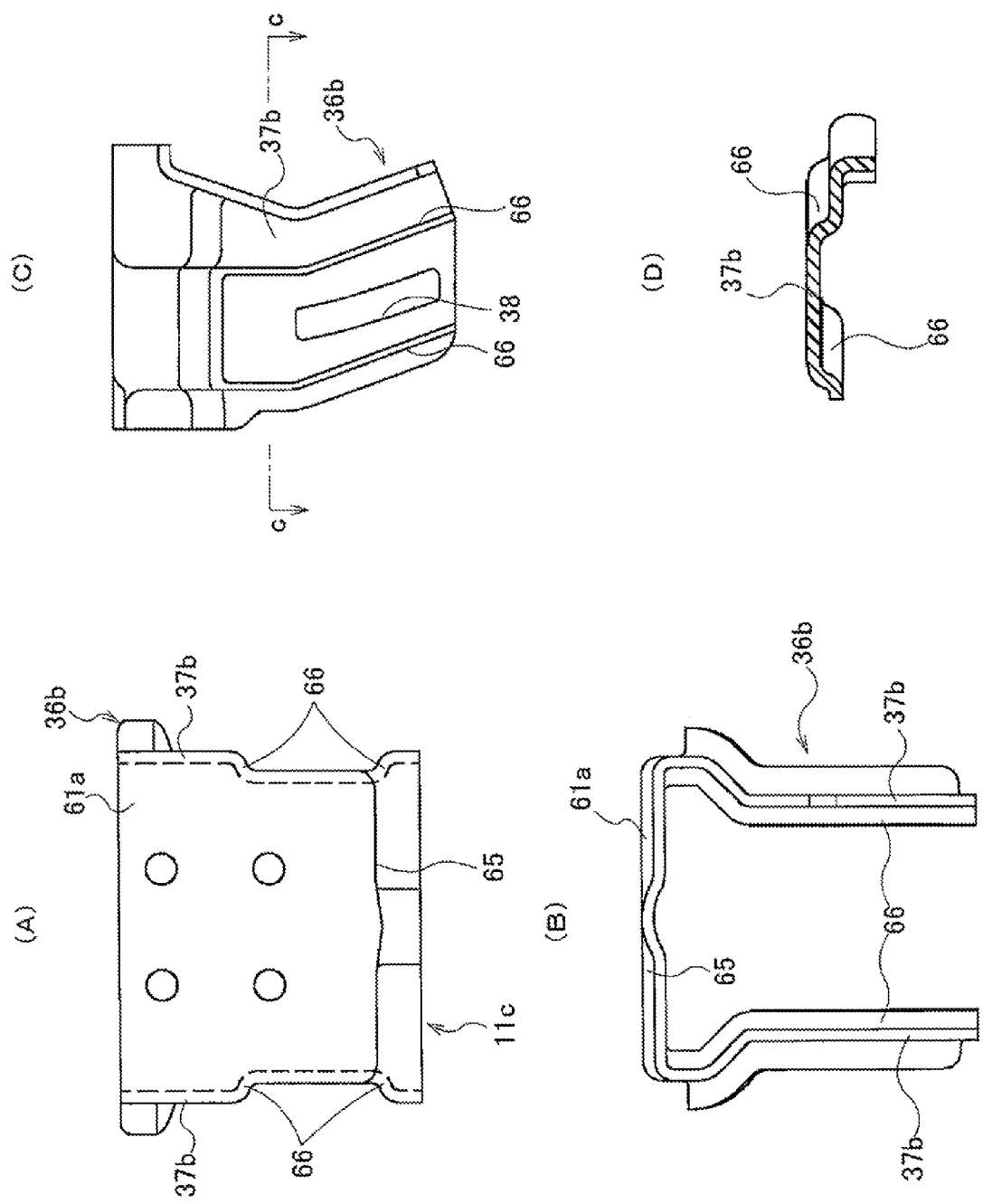
FIG. 18A is a top view of the support bracket on the column side in FIG. 17.
FIG. 18B is an orthographical view thereof as seen from the rear.
FIG. 18C is a side view thereof.
FIG. 18D is a cross-sectional view of section c-c in FIG. 18C.
Figure 19:
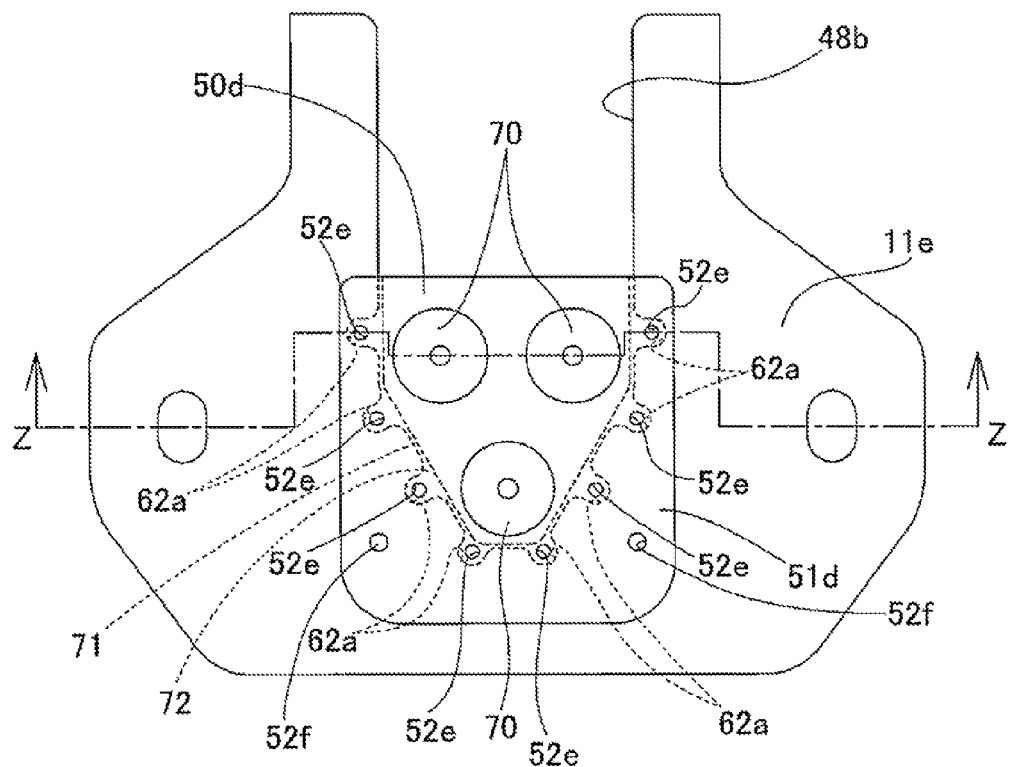
FIG. 19 is a top view illustrating the major parts of a first example of a third embodiment of the present invention.
Figure 20:
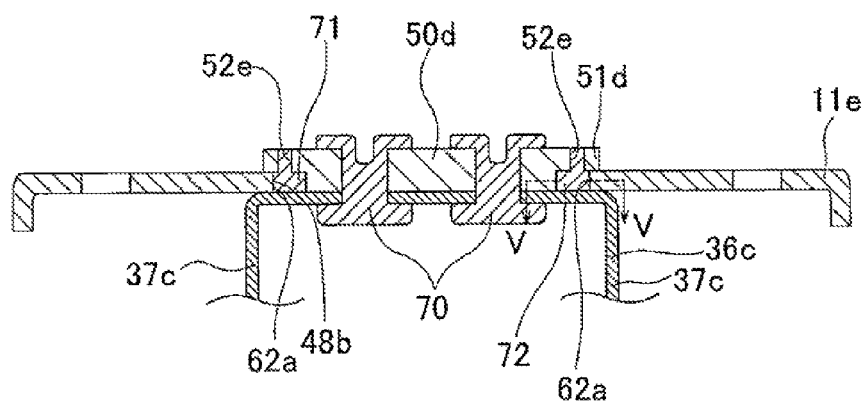
FIG. 20 is a cross-sectional view of section Z-Z in FIG. 19.
Figure 21:
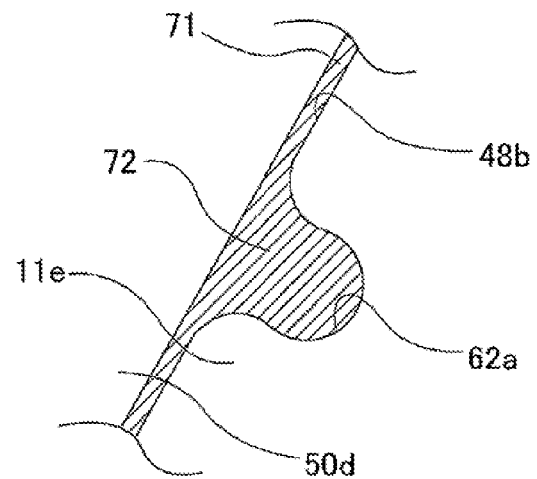
FIG. 21 is an enlarged cross-sectional view of section v-v in FIG. 20.
Figure 22:
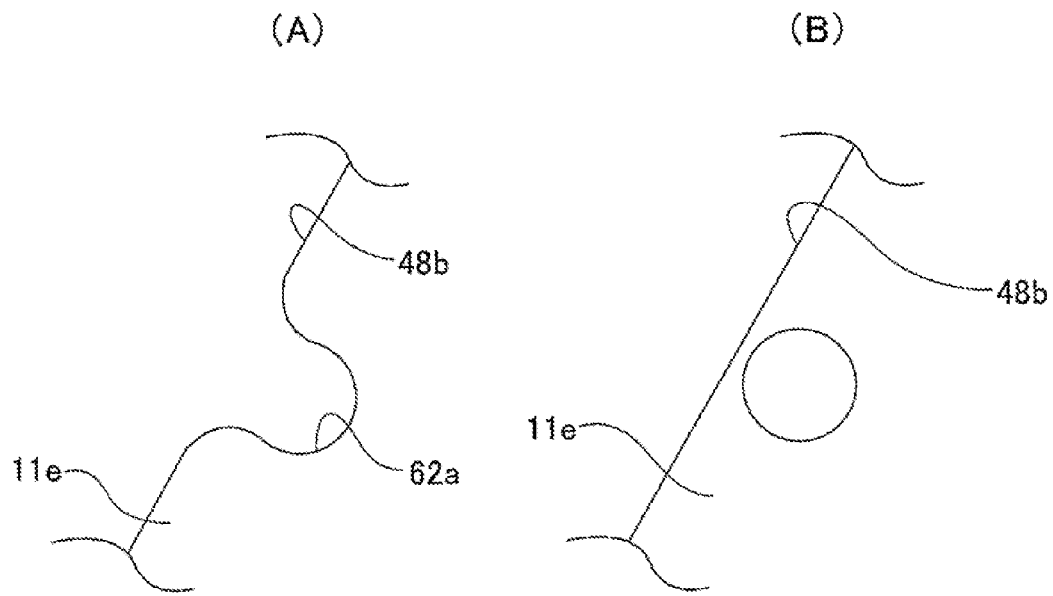
FIG. 22A is a partial top view illustrating the construction of a small notch section of the first example of the third embodiment of the present invention.
FIG. 22B is a partial top view of the construction of a small through hole that is used instead of the small notch.

FIG. 7 and FIG. 8 illustrate a third example of the first embodiment of the present invention. In this example, there is no bent section 59 that is formed on the outer edge around the fastening bracket 11b on the vehicle side as was done in the first example of the first embodiment. Instead, in this example, ribs 60a to 60c are formed in two locations in the forward/backward direction of the installation plate section 56a of the fastening bracket 11b on the vehicle side, such that they each protrude downward. In other words, one pair of ribs 60a are formed in the middle in the forward/backward direction of the installation plate section 56a in the portions on both the left and right sides of the locking capsule 50 in the normal state (state in which a secondary collision has not occurred). The outside end sections of these ribs 60a extend to the edges on both sides in the width direction of the installation plate section 56a. On the other hand, the inside end sections of the ribs 60a do not extend to the edges of the locking hole 48, but rather end part way in order that the ribs 60a do not hinder displacement in the forward direction of the locking capsule 50 during a secondary collision.

A short pair of ribs 60b are formed in the portion between the middle section in the forward/backward direction of the locking capsules 50 and the installation holes 49. The inside end sections of these ribs 60b, for the same reason as above, do not extend to the edges on the sides of the locking hole 48, but end part way. However, the outside end sections do not extend to the installation holes 49, but end part way, in order that the head sections of the bolts or the nuts can come in contact with the portions around the installation holes 49 directly or by way of a seat plate.

A pair of ribs 60c are formed in the portion near the rear end section of the installation plate section 56a on both the left and right sides of the portion near the rear end in the middle section of the locking capsule 50 in the normal state. The characteristics of these ribs 60c are the same as the rib 60a in the very front position. Furthermore, it is not illustrated in the figures, however, one rib can also be formed in the rear end section of the installation plate section 56a in the portion that protrudes further toward the rear than the locking capsule 50 in the normal state such that both end sections extend to the edges on both ends of the installation plate section 56a.

The position in the forward/backward direction of the virtual line A that connects the centers of the installation holes 49 is the same as in the first example. In other words, the virtual line A is positioned within the range of the length in the forward/backward direction of the locking capsule 50, and preferably between the virtual line B on the front side and the virtual line C on the rear side which are defined in relation to the three bolts 54 which connect the locking capsule 50 and the support bracket 36 on the column side, and most preferably in the exact center between the front virtual line B and the rear virtual line C, which is also the same as in the first example.

With the construction of this kind of example, as in the case of the first example, it is possible to reduce the moment that is applied from the fastening bracket 11b on the vehicle side to the bolts or studs that are inserted through the installation holes 49, and thus it is essentially possible to increase the rigidity of the supporting and fastening section of the fastening bracket 11b on the vehicle side with respect to the vehicle body. Moreover, the top surface of the fastening bracket 11b on the vehicle side is flat, so it is possible to maintain good installation characteristics with the installation surface 57 (see FIG. 3) that is formed on the vehicle side. Furthermore, the bending rigidity of the rear half section of the fastening bracket 11b on the vehicle side that locks the locking capsule 50 that connects the fastening bracket 11b on the vehicle side and the steering column 6c is high. Therefore, it is possible to reduce costs by simplifying the work of processing parts, managing parts, and performing assembly, and to maintain freedom of design by reducing the assembly height. Except for changing the shape of the fastening bracket 11b on the vehicle side, the other construction and functions are the same as in the first example of the first embodiment, so drawings and explanations of identical parts are omitted.

First Example of Second Embodiment

FIG. 9 to FIG. 13 illustrate a first example of a second embodiment of the present invention. In this example, a member that is formed by bending a metal plate having sufficient strength and rigidity, such as steel plate, is used as the locking capsule 50a. A flange section 51a for holding the peripheral section of the locking hole (locking notch) 48a that is formed on part of the fastening bracket 11c on the vehicle side with the top plate section 61 of the supporting bracket 36a on the column side is formed on the rear as well as on both sides in the width direction thereof. Moreover, in addition to small through holes 52d, small notch sections 62 are formed in the peripheral portion of the notch hole 48a on part of the fastening bracket 11c on the vehicle side. These small notch sections 62 are open on the inside of the locking hole 48a.

The locking pins (not illustrated in the figures) for supporting the support bracket 36a on the column side and the locking capsule 50a with respect to the fastening bracket 11c on the vehicle side so that they can break away in the forward direction due to a secondary collision are formed by injection molding in which synthetic resin is injected in a molten state from the small through holes 52c that are formed on the flange section 51a, and forced inside the small through holes 52d and the small notch sections 62 in the fastening bracket 11c on the vehicle side, then cooled and solidified. Part of this synthetic resin enters from the small notch sections 62 into the space between the inside edges of the locking hole 48a and the locking capsule 50a. This improves the support rigidity in the width direction of the connection section that connects the support bracket 36a on the column side and the locking capsule 50 to the fastening bracket 11c on the vehicle side. Moreover, this prevent rubbing between the metals of the inside surfaces of the locking hole 48a and the surfaces on both the left and right sides of the locking capsule 50a during a secondary collision, making possible a smooth break away during a secondary collision.

Furthermore, in the case of this example, the space between the pair of left and right support plate sections 37a of the support bracket 36a on the column side is made large at the top end section and small from the middle section in the up/down direction to the bottom end section. In order for this, stepped sections 63 are formed in the portion near the top of the middle sections in the up/down direction, forming a stepped shape. The other construction and functions are the same as in the first embodiment, so redundant drawings and explanations are omitted.

Second Example of Second Embodiment

FIG. 14 to FIG. 18 illustrate a second example of the second embodiment of the present invention. In this example, the bending rigidity of the support bracket 36b on the column side and the fastening bracket 11d on the vehicle side are improved over that of the first example of the second embodiment. In order to improve the bending rigidity in the width direction of the fastening bracket 11d on the vehicle side, the portion on the rear end section of the fastening bracket 11d on the vehicle side located further toward the rear than the locking hole 48 is caused to protrude in a continuous embankment shape in the width direction, forming a stepped section 64 in that portion. Moreover, in the case of the support bracket 36b on the column side, the portion near the rear end of the top plate section 61a is bent downward forming a stepped section 65, and by bending the middle section in the forward/backward direction of the pair of left and right support plate sections 37b inward in the width direction of the support bracket 36b on the column side, stepped sections 66 are formed at two locations in the forward/backward direction of each support plate section 37b. This improves the bending rigidity of the top plate section 61a and the support plate sections 37b of the support bracket 36b on the column side.

In the case of this example, the bending rigidity of the top plate section 61a and the support plate sections 37b is improved, so the support rigidity of the steering column 6c in the normal state is improved. Moreover, it is possible to suppress deformation of both brackets 11d, 36b during a secondary collision, and make it possible for break away of these brackets 11d, 36b during a secondary collision to be performed even more smoothly. The other construction and functions are the same as in the first example of the second embodiment, so redundant drawings and explanations are omitted.

First Example of Third Embodiment

FIG. 19 to FIG. 22 illustrate a first example of a third embodiment of the present invention. The feature of this third embodiment of the present invention, which includes this example, is that by designing the connection between the fastening bracket 11e on the vehicle side and the locking capsule 50d that is connected and fastened to the support bracket 36c on the column side, separation of this locking capsule 50d and the fastening bracket 11b on the vehicle side when a secondary collision occurs is performed smoothly. The other construction and functions are the same as in the construction of the first embodiment, so drawings and explanations of identical parts are simplified or omitted, such that this explanation centers on the features of this example and the parts that differ from the construction of the first embodiment.

The locking capsule 50d is connected and fastened to the top surface of the support bracket 36c on the column side by a plurality of rivets (three rivets in the example in the figures). The basic shape and construction of this locking capsule 50d is the same as the locking capsule 50 that is assembled in the construction of the first embodiment. However, the shape of the lower half section of the locking capsule 50d that is assembled in the construction of this example is a trapezoidal shape in which the edges on both the left and right sides from the middle section in the forward/backward direction to the rear end section are sloped in a direction such that the width direction becomes smaller going in the direction toward the rear. In other words, the shape of the locking capsule 50d is such that the upper half section and the lower half section are symmetrical in the left and right direction, however the edges on both the left and right sides from the middle section of the lower half section to the rear end section are sloped in opposite directions from each other. The upper half section of the locking capsule 50d overhangs toward both sides and toward the rear from the lower half section to form a flange section 51d.

On the other hand, the rear half section of the locking hole (locking notch) 48b that is formed in the fastening bracket 11e on the vehicle side also has the same shape as the lower half section of the locking capsule 50d (similar shape that is a little larger). However, the width dimension of this locking hole 48b is a little larger (about 0.5 to 2 mm larger, for example) than the width dimension of the lower half section of the locking capsule 50d that coincides in the forward/backward position in the combined state illustrated in FIG. 19. Moreover, small notch sections 62a are formed in a plurality of locations (8 locations in the example in the figures) in the inside edge sections of the locking hole 48b. These small notch sections 62a, as illustrated in FIG. 22A, are each open toward the inside of the notch hole 48b. Furthermore, small through holes 52e are formed in part of the flange section 51d of the locking capsule 50d in portions that are aligned with the small notch sections 62e. In this example, a pair of left and right small through holes 52f is also formed in portions in the flange section 51d that are separated from the small notch sections 62a. Small through holes (not illustrated in the figure) that are similar to those of the first embodiment are formed in the portions of the fastening bracket 11e on the vehicle side that are aligned with these small through holes 52f.

As described above, the locking capsule 50d in which small through holes 52e are formed in the upper half section of the flange section 51d, and that is connected and fastened to the support bracket 36c on the column side by rivets 70, and the fastening bracket 11e on the vehicle side in which small notch sections 62a and small though holes (not illustrated in the figures) are formed, are connected using synthetic resin such that they can be separated due to the impact load during a secondary collision. In other words, injection molding is performed in which synthetic resin, which is a thermoplastic resin, is injected in a molten state between the small notch sections 62a and small through holes that are formed in the fastening bracket 11e on the vehicle side and the small through holes 52e, 52f that are formed in the locking capsule so that it spans between the fastening bracket 11 on the vehicle side and the flange sections 51d, and then solidified. When doing this, the lower half section of the locking capsule 50d is positioned in the center section in the width direction of the locking hole 48b, and a small space 71 is caused to exist between the edges on both the left and right sides of the lower half section and the inside edges of the locking hole 48, including the portions between the back end section of the locking hole 48b and the rear end surface of the lower half section.

The synthetic resin 72 enters inside the small notch sections 62a by way of the small holes 52e, and these small notch sections 62a are open toward the inside of the locking hole 48b. Therefore, the synthetic resin 72 that is fed inside the locking hole 48b penetrates inside the small space 71 along the entire length of the small space 71, and then solidifies inside this small space 71. The flow of synthetic resin from the small notch sections 62a to inside the small space 71 is performed smoothly. In other words, as illustrated in FIG. 22B, when a small hole is formed in part of the fastening bracket 11e on the vehicle side that is independent from the locking hole 48b, it is difficult for a sufficient amount of synthetic resin 72 to be fed inside the small space 71. However, in this example, as illustrated in FIG. 22A the small notch sections 62a are open toward the inside of the locking hole 48b, so a sufficient amount of synthetic resin 72 is fed inside the small space.

Of this synthetic resin 72, the portion that is inside the small through holes 52e and small notch sections 62a and that is cooled and solidified in a state spanning between these small through holes 52e and small notch sections 62a corresponds to the connecting member of the present invention. This supports and connects the locking capsule 50d to the fastening bracket 11e on the vehicle side so that displacement in the forward direction due to an impact load that is applied during a secondary collision is possible. Furthermore, part of the synthetic resin 72 that is fed inside the small notch sections 62a penetrates inside the small space that exists between the top and bottom surfaces of the fastening bracket 11e on the vehicle side, and the opposing surfaces, which are the bottom surface of the flange section 51d and the top surface of the support bracket 36c on the column side, and that synthetic resin cools and solidifies in the small space. As a result, vibration of the installation section of the support bracket 36c on the column with respect to the fastening bracket 11e on the vehicle side can be eliminated, and the feeling when operating the steering wheel 1 can be improved. It is also possible to have part of the synthetic resin penetrate so that of the top and bottom surfaces of the fastening bracket 11e on the vehicle side, and the opposing surfaces, which are the bottom surface of the flange section 51d and the top surface of the support bracket 36c on the column side, the space is eliminated and contact is created between one of the pairs of surfaces, and there is only a small space between the other pair of surfaces.

With the steering column support apparatus of this example, constructed as described above, tuning for stabilizing forward displacement of the steering wheel 1 during a secondary collision is simple, and the load required for the locking capsule 50d that is supported by the steering column by way of the support bracket 36c on the column side to come out in the forward direction from the locking hole 48b that is formed in the fastening bracket 11e on the vehicle side is kept low.

Particularly, synthetic resin 72 is filled into a small space that exists between the inside edges of the locking hole 48b and the edges on both sides of the lower half section of the locking capsule 50d, so it is possible to prevent direct rubbing of these edges. Therefore, even when the fastening bracket 11e on the vehicle side and the locking capsule 50d are made of metal, there is no rubbing between metal surfaces when the lower half section of the locking capsule 50d comes out from the locking hole 48b during a secondary collision. Even when large forces are applied in a forward diagonal direction as illustrated by arrows α and β in FIG. 4 to the locking capsule 50d from the steering wheel 1, the locking capsule 50d can be smoothly separated from the fastening bracket 11e on the vehicle side by a light force, and thus it is possible to completely protect the driver. Moreover, in the case of this example, the shape of the lower half section of the locking hole 48 and the locking capsule 50d is such that the width dimension becomes smaller going toward the rear, so it becomes even easier for the locking capsule 50d to come out from the locking hole 48b, and thus it is possible to even more completely protect the driver during a collision accident.

Second Example of Third Embodiment

Figure 23:
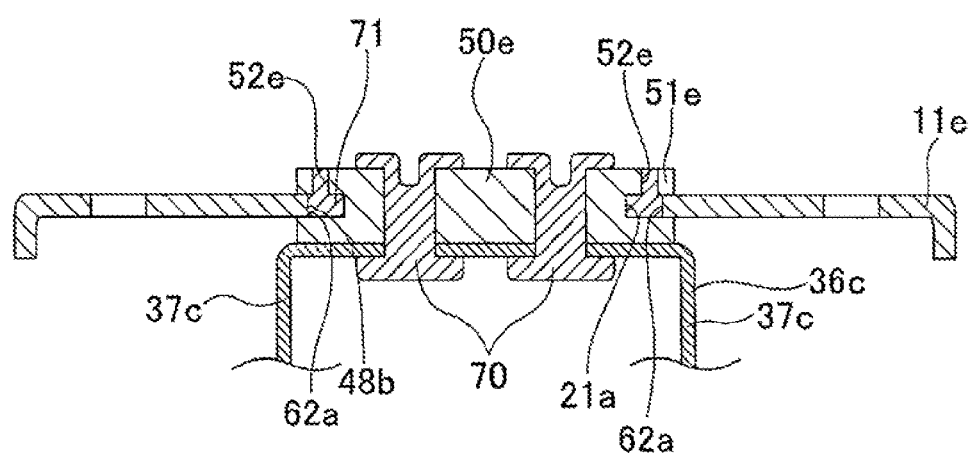
FIG. 23 is a drawing similar to FIG. 20, and illustrates a second example of the third embodiment of the present invention.

FIG. 23 illustrates a second example of the third embodiment of the present invention. In this example, locking grooves 21a are formed on both the left and right sides and the rear side of the locking capsule 50e, and this locking capsule 50e is formed by a base section that coincides in the height direction with the locking grooves 21a, and top and both sections that comprise top and bottom flange sections, with the locking grooves 21a engaging with the outer edges of the locking hole 48b of the fastening bracket 11e on the vehicle side. In other words, this example illustrates the case in which the present invention is applied to the second example of the first embodiment of the present invention. In the case of this kind of example, both end sections of the top section of the locking capsule 50e that is on the top side of the locking groove 21a corresponds to the flange section of the present invention. The construction and functions of other parts are the same as in the first example of the third embodiment, so drawings and explanations for identical parts are omitted.

Third Example of Third Embodiment

Figure 24:
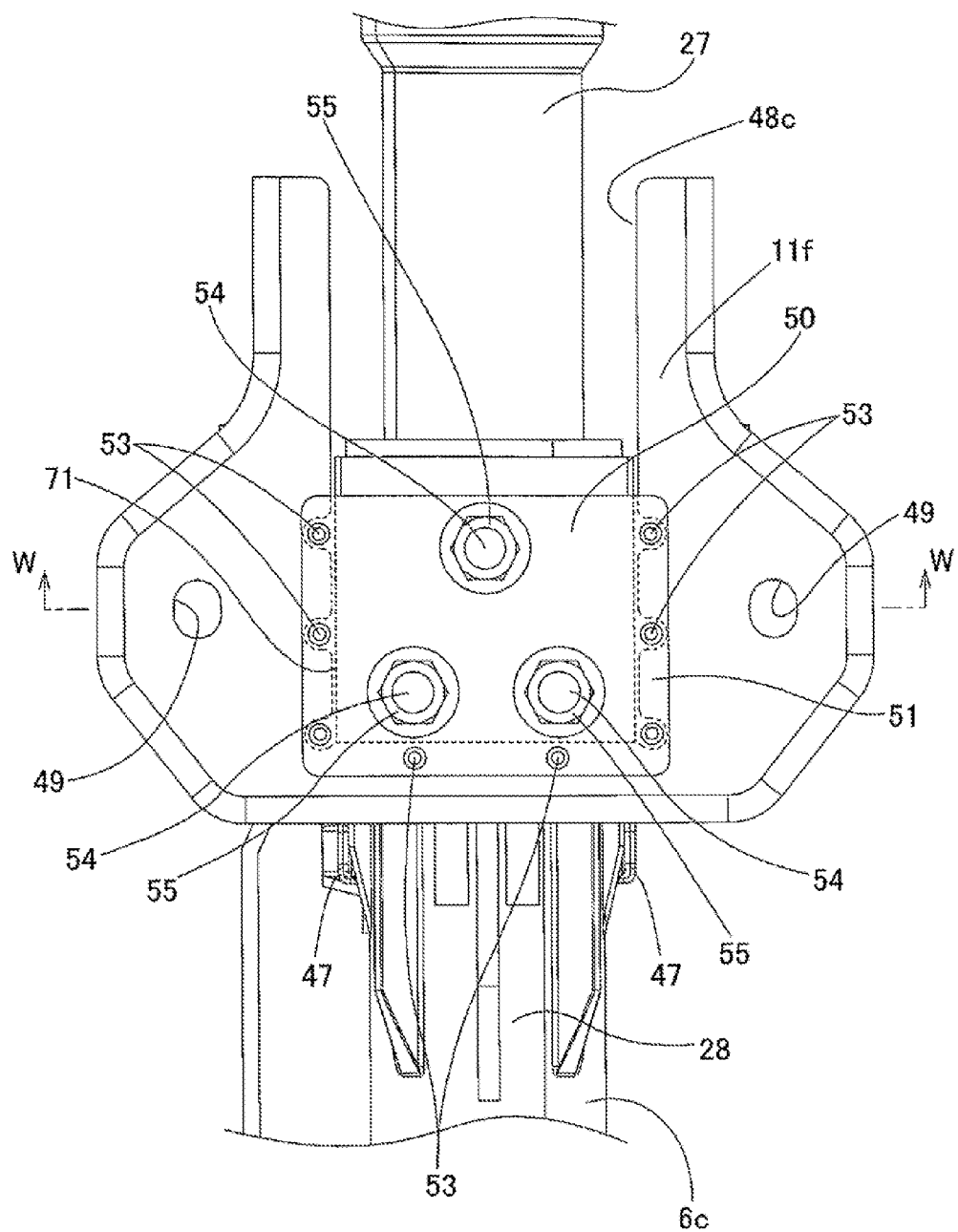
FIG. 24 is a partial top view illustrating a third example of the third embodiment of the present invention.
Figure 25:
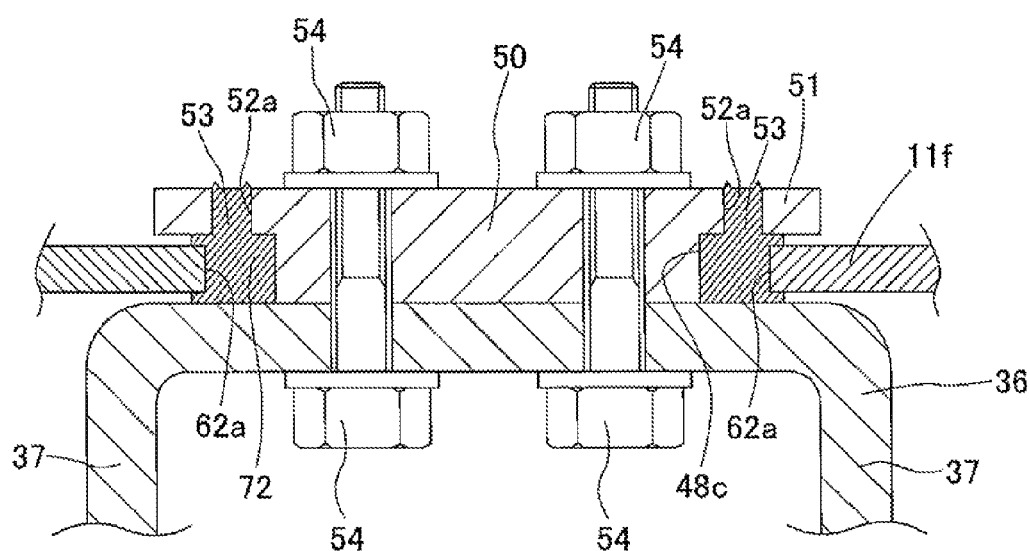
FIG. 25 is a cross-sectional view of section W-W in FIG. 24.

FIG. 24 and FIG. 25 illustrate a third example of the third embodiment of the present invention. This example is one example of applying the third embodiment to the first example of the first embodiment, where the basic shape of the locking capsule 50 and the locking hole 48c are the same as in the first embodiment. However, in positions along the edges on both sides of the locking hole 48c that are aligned with the small through holes 52a in the locking capsule 50, small notch sections 62a are formed in the fastening bracket 11f on the vehicle side. As in the first example of the third embodiment, the synthetic resin 72 is filled by injection molding so as to span between these small through holes 52a and small notch sections 62a, to form a connecting member. In this example as well, the synthetic resin 72 is filled into a small space 71 that exists between the inside edges of the locking hole 48c and the edges on both sides of the lower half of the locking capsule 50, so it is possible to prevent direct rubbing between these edges, and even when both the fastening bracket 11f on the vehicle side and the locking capsule 50 are made of metal, there is no strong rubbing between metal surfaces when the lower half section of the locking capsule 50 comes out from the locking hole 48c during a secondary collision. The construction and function of the other parts are the same as in the first example of the third embodiment, so drawings and explanations of identical parts are omitted.

INDUSTRIAL APPLICABILITY

The embodiments described above were explained for the case of applying the present invention to a steering column support apparatus that comprises both a tilt mechanism for adjusting the up/down position of a steering wheel, and a telescopic mechanism for similarly adjusting the forward/backward position of the steering wheel. However, the present invention can also be applied to a steering column support apparatus that comprises only a tilt mechanism or only a telescopic mechanism, and can be applied to a fixed steering wheel type steering column support apparatus that does not comprise either of these mechanisms.

The present invention devises innovative construction of the engagement section between the fastening bracket on the vehicle side and the locking capsule, and provides construction that prevents the locking capsule from dropping even as a secondary collision advances, however, the present invention can also be applied to the support bracket on the housing side. In that case, the support bracket on the housing side corresponds to the support bracket on the column side, so the locking capsule that is fastened to this support bracket on the housing side engages with the fastening bracket on the vehicle side that is fastened to the upper part of the support bracket on the housing side. Moreover, when a secondary collision advances, the support force of this support bracket on the housing side is maintained, and the up/down position of the steering wheel is kept within an appropriate range.

EXPLANATION OF THE REFERENCE NUMBERS

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10, 10a Housing
11, 11a, 11b, 11c, 11d, 11e, 11f Fastening bracket on the vehicle side
12, 12a Support bracket on the column side
13 Support bracket on the housing side
14a, 14b Installation plate section
15a, 15b Notch
16a, 16b Sliding plate
17 Energy absorbing member
18, 18a Electric motor
19 Locking notch
20 Locking capsule
21, 21a Locking groove
22a, 22b Locking hole
23 Locking pin
24 Installation hole
25 Connection bracket
26 Ball bearing
27 Inner column 28 Outer column
29 Outer shaft
30 Controller
31 Support cylinder
32 Center hole
33 Slit
34 Through hole in the circumferential direction
35 Supported plate section
36, 36a, 36b, 36c Support bracket on the column side
37, 37a, 37b, 37c Support plate section
38 Long hole in the up/down direction
39 Long hole in the forward/backward direction
40 Adjustment rod
41 Head section
42 Nut
43 Driving cam
44 Driven cam
45 Cam apparatus
46 Adjustment lever
47 Friction plate unit
48, 48a, 48b, 48 Locking hole
49 Installation hole
50, 50a, 50b, 50c, 50d, 50e Locking capsule
51, 51a, 51b, 51c, 51d, 51e Flange section
52a, 52b, 52c, 52d, 52e, 52f Small through hole
53 Locking pin
54 Bolt
55 Nut
56, 56a Installation plate section
57 Installation surface
58 Concave section
59 Bent section
60a, 60b, 60c Rib
61, 61a Top plate section
62, 62a Small notch section
63 Stepped section
64 Stepped section
65 Stepped section
66 Stepped section
67 Base plate section
68 Through hole
69, 69a Fillet weld
70 Rivet
71 Small space
72 Synthetic resin

What is claimed is:

1. A steering column support apparatus adapted for installation on a vehicle body defining forward and rearward directions and comprising a steering column having an axial direction, the steering column support apparatus comprising:

a fastening bracket located on a vehicle side of the steering column support apparatus, the fastening bracket comprising a locking hole that is located in a center section in a width direction of the fastening bracket and extends in the axial direction of the steering column, the fastening bracket being fastened to and supported by the vehicle body such that the fastening bracket does not displace in the forward direction of the vehicle body during a secondary collision;

a support bracket located on a steering column side of the steering column support apparatus, the support bracket being supported by the steering column;

a locking capsule that has a width direction and comprises a base section and a top section, the base section being positioned inside the locking hole of the fastening bracket and having a width dimension that is equal to or less than a width dimension of the locking hole, the top section having a width dimension that is larger than the width dimension of the locking hole, and having oppositely-disposed flange sections that protrude further in the width direction of the locking capsule than the base section, the locking capsule being fastened to the support bracket so that the base section is engaged in the locking hole in the width direction of the locking capsule, and the flange sections are located on the fastening bracket on opposite sides of the locking hole;

a connecting member that is made of a material that shears due to an impact load that is applied during the secondary collision, and that, with the base section of the locking capsule positioned inside the locking hole, connects the locking capsule and the fastening bracket, the support bracket being supported by the fastening bracket by way of the locking capsule and the connecting member such that the support bracket is displaced with the steering column due to an impact load that is applied during a secondary collision;

a plurality of through holes in the flange sections of the locking capsule, notch sections in portions of the fastening bracket that are aligned with the through holes and open toward the locking hole, and the connecting member being provided such that the connecting member spans between the through holes and the notch sections; and part of the material of the connecting member penetrating between an inner surface of the locking hole and a surface of the locking capsule that faces the inner surface of the locking hole, and covering at least part of a space that exists between the inner surface of the locking hole and the surface of the locking capsule that faces the inner surface of the locking hole.

2. The steering column support apparatus according to claim 1, wherein the material of the connecting member is synthetic resin and the connecting member is formed by an injection molding process that injects the synthetic resin into the through holes and notch sections, with part of the synthetic resin covering an entire length of the space that exists between the inner surface of the locking hole and the surface of the locking capsule that faces the inner surface of the locking hole.

3. The steering column support apparatus according to claim 1, wherein edges on sides of at least a rear section of the locking hole are sloped toward each other in the rearward direction.

4. The steering column support apparatus according to claim 1, wherein in addition to the space between the inner surface of the locking hole and the surface of the locking capsule that faces that inner surface, the material of the connecting member also covers at least part of spaces between opposite surfaces of the fastening bracket and opposing surfaces of the locking capsule and the support bracket.

5. The steering column support apparatus according to claim 1, wherein a length of the locking hole in a forward-rearward direction is longer than a length of the locking capsule in the forward-rearward direction, and the length is long enough that even when the locking capsule has displaced in the forward direction together with the steering column during the secondary collision, at least part of the locking capsule is positioned on a front end section of the fastening bracket to prevent the locking capsule from dropping through the locking hole.

* * * * *